US012215925B2

(12) United States Patent
Zielinski et al.

(10) Patent No.: US 12,215,925 B2
(45) Date of Patent: Feb. 4, 2025

(54) METHODS AND APPARATUSES FOR DRYING ELECTRONIC DEVICES

(71) Applicant: REVIVE ELECTRONICS, LLC, Fishers, IN (US)

(72) Inventors: Reuben Zielinski, Fishers, IN (US); David Douberteen, Indianapolis, IN (US); Mark Earle, Fishers, IN (US)

(73) Assignee: Revive Electronics, LLC, Fishers, IN (US)

( * ) Notice: Subject to any disclaimer, the term of this patent is extended or adjusted under 35 U.S.C. 154(b) by 0 days.

(21) Appl. No.: 18/386,918

(22) Filed: Nov. 3, 2023

(65) Prior Publication Data

US 2024/0060721 A1 Feb. 22, 2024

Related U.S. Application Data

(63) Continuation-in-part of application No. 18/228,504, filed on Jul. 31, 2023, which is a continuation of
(Continued)

(51) Int. Cl.
*F26B 25/22* (2006.01)
*F26B 3/02* (2006.01)
(Continued)

(52) U.S. Cl.
CPC ................ *F26B 25/22* (2013.01); *F26B 3/02* (2013.01); *F26B 3/20* (2013.01); *F26B 5/04* (2013.01);
(Continued)

(58) Field of Classification Search
CPC .... F26B 25/22; F26B 3/02; F26B 3/20; F26B 5/04; F26B 9/06; F26B 9/106; F26B 23/04
(Continued)

(56) References Cited

U.S. PATENT DOCUMENTS 1,854,956 A 4/1932 Reeve
1,854,958 A 4/1932 Santosuosso
(Continued)

FOREIGN PATENT DOCUMENTS

AU 2003100364 7/2003
CA 2050668 A1 3/1992
(Continued)

OTHER PUBLICATIONS

International Search Report and Written Opinion dated Feb. 25, 2019 in cinnection with International Application No. PCT/US2018/058492, 7 pages.

(Continued)

*Primary Examiner* — Stephen M Gravini
(74) *Attorney, Agent, or Firm* — Baker & McKenzie LLP

(57) ABSTRACT

Methods and apparatuses for drying electronic devices are disclosed. An exemplary method comprises: placing a portable electronic device into a drying chamber; providing a first air channel, wherein the first air channel connects the drying chamber, a pressure-generating device, and a moisture-reducing device; generating a first air flow through the first air channel using the pressure-generating device; removing a first moisture from an interior of the portable electronic device to an exterior of the portable electronic device; detecting moisture removed from the portable electronic device; pausing the generating the first air flow through the first air channel based on the amount of moisture; providing a second air channel, wherein the second air channel connects the moisture-reducing device, the pressure-generating device, a valve, and an evacuation channel; generating a second air flow through the second air channel using the pressure-generating device; and removing a second moisture from the moisture-reducing device.

12 Claims, 21 Drawing Sheets

Related U.S. Application Data application No. 17/134,492, filed on Dec. 27, 2020, now Pat. No. 11,713,924, which is a continuation of application No. 16/854,862, filed on Apr. 21, 2020, now Pat. No. 10,876,792.

(60) Provisional application No. 63/422,838, filed on Nov. 4, 2022.

(51) Int. Cl.
*F26B 3/20* (2006.01)
*F26B 5/04* (2006.01)
*F26B 9/06* (2006.01)
*F26B 9/10* (2006.01)
*F26B 23/04* (2006.01)

(52) U.S. Cl.
CPC ................ *F26B 9/06* (2013.01); *F26B 9/106* (2013.01); *F26B 23/04* (2013.01)

(58) Field of Classification Search
USPC ............................................................ 34/403
See application file for complete search history.

(56) References Cited

U.S. PATENT DOCUMENTS

| | | | |
|---|---|---|---|
| 2,496,054 | A | 1/1950 | Hoyler |
| 2,846,710 | A | 8/1958 | Haka |
| 3,302,303 | A | 2/1967 | Marcel |
| 3,698,098 | A | 10/1972 | Ramsay |
| 3,721,101 | A | 3/1973 | Sheppard |
| 3,897,604 | A | 8/1975 | Weimer |
| 3,932,944 | A | 1/1976 | Chiba |
| 4,020,563 | A | 5/1977 | Hoefer |
| 4,054,376 | A | 10/1977 | Wareham |
| 4,386,471 | A | 6/1983 | Bowrey et al. |
| 4,395,830 | A | 8/1983 | Lockwood |
| 4,464,582 | A | 8/1984 | Aragaki et al. |
| 4,515,751 | A | 5/1985 | Krieg, Jr. |
| 4,558,206 | A | 12/1985 | Ball |
| 4,589,971 | A | 5/1986 | Mayeaux |
| 4,704,805 | A | 11/1987 | Kaya et al. |
| 4,733,428 | A | 3/1988 | Malinge et al. |
| 4,882,851 | A | 11/1989 | Wennerstrum et al. |
| 5,005,410 | A | 4/1991 | Webster et al. |
| 5,038,494 | A | 8/1991 | Lundquist et al. |
| 5,067,251 | A | 11/1991 | Zlobinsky et al. |
| 5,122,344 | A | 6/1992 | Schmoegner |
| 5,172,488 | A | 12/1992 | Okane et al. |
| 5,203,859 | A | 4/1993 | Khinkis et al. |
| 5,222,307 | A | 6/1993 | Oba et al. |
| 5,293,697 | A | 3/1994 | Kawakami |
| 5,318,164 | A | 6/1994 | Barnes et al. |
| 5,335,703 | A | 8/1994 | deJong |
| 5,343,747 | A | 9/1994 | Rosen |
| 5,349,543 | A | 9/1994 | Buliszyn et al. |
| 5,349,845 | A | 9/1994 | Blom |
| 5,376,392 | A | 12/1994 | Ikegami et al. |
| 5,377,425 | A | 1/1995 | Kawakami et al. |
| 5,456,025 | A | 10/1995 | Joiner et al. |
| 5,548,905 | A | 8/1996 | Kuma et al. |
| 5,578,753 | A | 11/1996 | Weiss et al. |
| 5,625,962 | A | 5/1997 | Fleissner |
| 5,636,446 | A | 6/1997 | Mae et al. |
| 5,640,783 | A | 6/1997 | Schumaier |
| 5,671,546 | A | 9/1997 | Haala |
| 5,671,548 | A | 9/1997 | Blaschka |
| 5,715,612 | A | 2/1998 | Schwenkler |
| 5,732,478 | A | 3/1998 | Chapman et al. |
| 5,852,879 | A | 12/1998 | Schumaier |
| 5,884,006 | A | 3/1999 | Frohlich et al. |
| 5,889,466 | A | 3/1999 | Ferguson |
| 5,992,049 | A | 11/1999 | Trost |
| 6,025,580 | A | 2/2000 | Yagi |
| 6,039,696 | A | 3/2000 | Bell |
| 6,067,727 | A | 5/2000 | Muraoka |
| 6,122,836 | A | 9/2000 | Tenedini et al. |
| 6,170,171 | B1 | 1/2001 | Schmidbauer et al. |
| 6,185,839 | B1 | 2/2001 | Kholodenko et al. |
| 6,266,123 | B1 | 7/2001 | Maejima et al. |
| 6,372,508 | B1 | 4/2002 | Shnizer et al. |
| 6,399,920 | B1 | 6/2002 | Guinn |
| 6,470,593 | B1 | 10/2002 | Seo |
| 6,508,599 | B2 | 1/2003 | Blume |
| 6,530,160 | B1 | 3/2003 | Gookins |
| 6,551,552 | B1 | 4/2003 | Lyublinski et al. |
| 6,552,308 | B2 | 4/2003 | Nishimura |
| 6,557,268 | B1 | 5/2003 | Berg et al. |
| 6,568,249 | B2 | 5/2003 | Devine |
| 6,622,399 | B1 | 9/2003 | Theriault et al. |
| 6,625,900 | B1 | 9/2003 | Tobias |
| 6,652,744 | B2 | 11/2003 | Lutze et al. |
| 6,675,636 | B2 | 1/2004 | Sadler |
| 6,760,981 | B2 | 7/2004 | Leap |
| 6,821,025 | B2 | 11/2004 | Gerhard |
| 6,834,443 | B2 | 12/2004 | Bloemendaal |
| 6,874,247 | B1 | 4/2005 | Hsu |
| 6,893,530 | B2 | 5/2005 | Kishimoto et al. |
| 6,938,359 | B2 | 9/2005 | Bigersson et al. |
| 6,943,325 | B2 | 9/2005 | Pittman et al. |
| 7,017,276 | B2 | 3/2006 | Greenspan et al. |
| 7,050,837 | B2 | 5/2006 | Menz et al. |
| 7,182,820 | B2 | 2/2007 | Campbell et al. |
| 7,194,822 | B2 | 3/2007 | Kolari |
| 7,205,900 | B2 | 4/2007 | Liu et al. |
| 7,243,857 | B2 | 7/2007 | Kallestad |
| 7,418,970 | B2 | 9/2008 | Sugimoto et al. |
| 7,460,350 | B2 | 12/2008 | Talbot et al. |
| 7,493,705 | B2 | 2/2009 | Gomi |
| 7,557,466 | B2 | 7/2009 | Wong et al. |
| 7,594,343 | B2 | 9/2009 | Woerdehoff et al. |
| 7,612,315 | B2 | 11/2009 | Corradini |
| 7,631,538 | B2 | 12/2009 | Imhof |
| 7,665,226 | B2 | 2/2010 | Tsuruta et al. |
| 7,814,678 | B2 | 10/2010 | Romanek |
| 7,992,318 | B2 | 8/2011 | Kawaji et al. |
| 8,058,588 | B2 | 11/2011 | Gagas et al. |
| 8,108,074 | B2 | 1/2012 | Boder |
| 8,112,900 | B2 | 2/2012 | Romanek |
| 8,203,689 | B2 | 6/2012 | Gomi |
| 8,281,499 | B2 | 10/2012 | Friesen et al. |
| 8,355,233 | B2 | 1/2013 | Schumacher et al. |
| 8,416,542 | B2 | 4/2013 | Nakamura |
| 8,446,049 | B2 | 5/2013 | Lee |
| 8,498,087 | B2 | 7/2013 | Rabu et al. |
| 8,689,461 | B1 | 4/2014 | Cookson et al. |
| 8,886,971 | B2 | 11/2014 | Chuang |
| 8,991,067 | B2 | 3/2015 | Zielinski et al. |
| 9,071,046 | B2 | 6/2015 | Stevens et al. |
| 9,488,564 | B2 | 11/2016 | Zielinski et al. |
| 9,488,565 | B2 * | 11/2016 | Zielinski ................ G01N 19/10 |
| 9,513,053 | B2 | 12/2016 | Zielinski et al. |
| 9,644,891 | B2 | 5/2017 | Zielinski et al. |
| 9,683,780 | B2 | 6/2017 | Zielinski et al. |
| 9,709,327 | B2 | 7/2017 | Marchiori |
| 9,746,241 | B2 | 8/2017 | Zielinski et al. |
| 9,816,757 | B1 | 11/2017 | Zielinski et al. |
| 9,970,708 | B2 | 5/2018 | Zielinski et al. |
| 10,074,667 | B1 | 9/2018 | Higashi et al. |
| 10,240,867 | B2 | 3/2019 | Zielinski et al. |
| 10,690,413 | B2 | 6/2020 | Zielinski et al. |
| 10,876,792 | B2 * | 12/2020 | Zielinski ................... F26B 3/20 |
| 11,713,924 | B2 * | 8/2023 | Zielinski ................. F26B 23/04 34/92 |
| 2001/0025431 | A1 | 10/2001 | Kitano et al. |
| 2001/0040667 | A1 | 11/2001 | Sasaki |
| 2001/0045421 | A1 | 11/2001 | Sullivan |
| 2002/0047587 | A1 | 4/2002 | Lee et al. |
| 2003/0019124 | A1 | 1/2003 | Miyakawa et al. |
| 2003/0115768 | A1 | 6/2003 | Hoffman |
| 2003/0116975 | A1 | 6/2003 | Cole |
| 2003/0160681 | A1 | 8/2003 | Menard et al. |
| 2003/0227550 | A1 | 12/2003 | Manico et al. |

(56) References Cited

U.S. PATENT DOCUMENTS

| | | | |
|---|---|---|---|
| 2004/0050076 | A1 | 3/2004 | Palfy et al. |
| 2004/0079136 | A1 | 4/2004 | Pillion |
| 2004/0082886 | A1 | 4/2004 | Timpson |
| 2004/0098811 | A1 | 5/2004 | Tuttle et al. |
| 2004/0186620 | A1 | 9/2004 | Chirnomas |
| 2005/0044744 | A1 | 3/2005 | Tadano |
| 2005/0079888 | A1 | 4/2005 | Menz et al. |
| 2005/0081890 | A1 | 4/2005 | Ato et al. |
| 2005/0112040 | A1 | 5/2005 | Hasegawa et al. |
| 2005/0217136 | A1 | 10/2005 | Blankenship et al. |
| 2005/0218239 | A1 | 10/2005 | Busch |
| 2005/0285748 | A1 | 12/2005 | Pedraza et al. |
| 2006/0029730 | A1 | 2/2006 | Campbell et al. |
| 2006/0058069 | A1 | 3/2006 | Garcia et al. |
| 2006/0137213 | A1 | 6/2006 | Asuke |
| 2006/0164772 | A1 | 7/2006 | Guo |
| 2006/0208914 | A1 | 9/2006 | Liu et al. |
| 2006/0236559 | A1 | 10/2006 | Mori |
| 2006/0255166 | A1 | 11/2006 | Imamura et al. |
| 2006/0277782 | A1 | 12/2006 | Chen |
| 2007/0033824 | A1 | 2/2007 | Okajima et al. |
| 2007/0199203 | A1 | 8/2007 | Federico |
| 2007/0225863 | A1 | 9/2007 | Gross et al. |
| 2007/0258870 | A1 | 11/2007 | Brown et al. |
| 2007/0271811 | A1 | 11/2007 | Tsuruta et al. |
| 2008/0013241 | A1 | 1/2008 | Wong et al. |
| 2008/0055235 | A1 | 3/2008 | Tanaka |
| 2008/0063809 | A1 | 3/2008 | Lee et al. |
| 2008/0083723 | A1 | 4/2008 | Tsukamoto et al. |
| 2008/0200779 | A1 | 8/2008 | Zimmerling et al. |
| 2008/0204218 | A1 | 8/2008 | Tupman |
| 2008/0233018 | A1 | 9/2008 | van Dam et al. |
| 2008/0256822 | A1 | 10/2008 | Suzuki et al. |
| 2008/0281528 | A1 | 11/2008 | Relle, Jr. |
| 2009/0019718 | A1 | 1/2009 | Mittleman et al. |
| 2009/0022434 | A1 | 1/2009 | Chiba et al. |
| 2009/0077825 | A1 | 3/2009 | Toofan et al. |
| 2009/0090022 | A1 | 4/2009 | Ho et al. |
| 2009/0145783 | A1 | 6/2009 | Forker |
| 2009/0158614 | A1 | 6/2009 | Singh et al. |
| 2009/0227118 | A1 | 9/2009 | Liu et al. |
| 2009/0272176 | A1 | 11/2009 | Lopez et al. |
| 2009/0273480 | A1 | 11/2009 | Mittleman et al. |
| 2010/0011609 | A1 | 1/2010 | Park et al. |
| 2010/0032600 | A1 | 2/2010 | Doe et al. |
| 2010/0040213 | A1 | 2/2010 | Park et al. |
| 2010/0088922 | A1 | 4/2010 | Romanek |
| 2010/0095504 | A1 | 4/2010 | Slack et al. |
| 2010/0097642 | A1 | 4/2010 | Sumi |
| 2010/0103566 | A1 | 4/2010 | Chen |
| 2010/0122470 | A1 | 5/2010 | Davis et al. |
| 2010/0206096 | A1 | 8/2010 | Lee et al. |
| 2010/0273477 | A1 | 10/2010 | Namaky |
| 2010/0304091 | A1 | 12/2010 | Wang |
| 2011/0047814 | A1 | 3/2011 | Watson et al. |
| 2011/0060945 | A1 | 3/2011 | Leprince et al. |
| 2011/0061477 | A1 | 3/2011 | Fitz |
| 2011/0067262 | A1 | 3/2011 | Eero |
| 2011/0099831 | A1 | 5/2011 | Parisi et al. |
| 2011/0104940 | A1 | 5/2011 | Rabu et al. |
| 2011/0137607 | A1 | 6/2011 | Hsieh |
| 2011/0219640 | A1 | 9/2011 | Latos |
| 2011/0247233 | A1 | 10/2011 | Bland |
| 2011/0279931 | A1 | 11/2011 | Nakamura |
| 2012/0020015 | A1 | 1/2012 | Tian et al. |
| 2012/0038374 | A1 | 2/2012 | Johnson |
| 2012/0079100 | A1 | 3/2012 | Mcintyre et al. |
| 2012/0085324 | A1 | 4/2012 | Saito et al. |
| 2012/0132360 | A1 | 5/2012 | Damm |
| 2012/0171462 | A1 | 7/2012 | Tsai |
| 2012/0231841 | A1 | 9/2012 | Niederberger et al. |
| 2012/0304483 | A1 | 12/2012 | Sirard et al. |
| 2013/0055585 | A1 | 3/2013 | Fujiwara |
| 2013/0073690 | A1 | 3/2013 | DeSalvo et al. |
| 2013/0088094 | A1 | 4/2013 | Paik |
| 2013/0096375 | A1 | 4/2013 | Iyama et al. |
| 2013/0111227 | A1 | 5/2013 | Sauerwein, Jr. |
| 2013/0151870 | A1 | 6/2013 | Chuang |
| 2013/0167874 | A1 | 7/2013 | Mittleman et al. |
| 2013/0182360 | A1 | 7/2013 | Stevens et al. |
| 2013/0192083 | A1 | 8/2013 | Zielinski et al. |
| 2013/0207455 | A1 | 8/2013 | Doljack |
| 2013/0287213 | A1 | 10/2013 | Sekiyama |
| 2013/0294017 | A1 | 11/2013 | Ola |
| 2013/0339304 | A1 | 12/2013 | Lee et al. |
| 2014/0130573 | A1 | 5/2014 | Zielinski et al. |
| 2014/0157619 | A1 | 6/2014 | Cookson et al. |
| 2014/0160680 | A1 | 6/2014 | Stevens |
| 2014/0185177 | A1 | 7/2014 | Li |
| 2014/0191588 | A1 | 7/2014 | Stevens |
| 2014/0191874 | A1 | 7/2014 | Stevens |
| 2014/0237268 | A1 | 8/2014 | Mese |
| 2014/0247529 | A1 | 9/2014 | Borini et al. |
| 2014/0259730 | A1 | 9/2014 | Zielinski et al. |
| 2014/0307356 | A1 | 10/2014 | Hong et al. |
| 2015/0122422 | A1 | 5/2015 | Hayasaka et al. |
| 2015/0168059 | A1 | 6/2015 | Zielinski et al. |
| 2015/0179037 | A1 | 6/2015 | Ren et al. |
| 2015/0179418 | A1 | 6/2015 | Ashtikar et al. |
| 2015/0192362 | A1 | 7/2015 | Zielinski et al. |
| 2015/0226481 | A1 | 8/2015 | Marchiori |
| 2016/0080553 | A1 | 3/2016 | Dempster et al. |
| 2016/0126722 | A1 | 5/2016 | Liao |
| 2016/0149394 | A1 | 5/2016 | Trusty et al. |
| 2016/0162256 | A1 | 6/2016 | Komaromi et al. |
| 2016/0239047 | A1 | 8/2016 | Weber |
| 2016/0241059 | A1 | 8/2016 | Li |
| 2016/0241945 | A1 | 8/2016 | Zadesky et al. |
| 2017/0082360 | A1 | 3/2017 | Zielinski et al. |
| 2017/0205143 | A1 | 7/2017 | Zielinski et al. |
| 2017/0314854 | A1 | 11/2017 | Marchiori |
| 2018/0289845 | A1 | 10/2018 | Chan |
| 2018/0292132 | A1 | 10/2018 | Zielinski et al. |
| 2019/0031423 | A1 | 1/2019 | De La Torre Barreiro et al. |
| 2019/0219332 | A1 | 7/2019 | Zielinski et al. |
| 2019/0314535 | A1 | 10/2019 | Golkowski et al. |
| 2020/0031319 | A1 | 1/2020 | Belanger et al. |
| 2020/0173573 | A1 | 6/2020 | Yokoe |
| 2023/0375270 | A1* | 11/2023 | Zielinski ................... F26B 5/04 |
| 2024/0060721 | A1* | 2/2024 | Zielinski ................. F26B 23/04 |

FOREIGN PATENT DOCUMENTS

| | | | |
|---|---|---|---|
| CA | 2596104 | C | 2/2008 |
| CA | 2863649 | A1 | 8/2013 |
| CN | 2065321 | U | 11/1990 |
| CN | 1119266 | A | 3/1996 |
| CN | 2307264 | Y | 2/1999 |
| CN | 201018665 | Y | 2/2008 |
| CN | 201255562 | Y | 6/2009 |
| CN | 101986360 | A | 3/2011 |
| CN | 201955259 | U | 8/2011 |
| CN | 109718837 | A | 5/2019 |
| DE | 19539392 | A1 | 4/1997 |
| DE | 102006047664 | A1 | 4/2008 |
| EP | 0539607 | A1 | 5/1993 |
| EP | 0639748 | A1 | 2/1995 |
| EP | 1125177 | B1 | 1/2004 |
| EP | 1080333 | B1 | 8/2009 |
| EP | 2573493 | A1 | 3/2013 |
| EP | 2810004 | A1 | 12/2014 |
| EP | 2479523 | A4 | 2/2015 |
| EP | 3462117 | A1 | 4/2019 |
| EP | 3525308 | A1 | 8/2019 |
| JP | 06-084878 | | 3/1994 |
| JP | 07-027474 | | 1/1995 |
| JP | 07-233931 | A | 9/1995 |
| JP | 7265824 | | 10/1995 |
| JP | 08-261646 | | 10/1996 |
| JP | H10174301 | A | 6/1998 |
| JP | 2001197175 | A | 7/2001 |
| JP | 2001-523329 | A | 11/2001 |
| JP | 2003142451 | A | 5/2003 |
| JP | 2004-232965 | A | 8/2004 |

(56) References Cited

FOREIGN PATENT DOCUMENTS

| | | | |
|---|---|---|---|
| JP | 2006019607 | A | 1/2006 |
| JP | 2006-140531 | A | 6/2006 |
| JP | 2006324506 | A | 11/2006 |
| JP | 2006325643 | A | 12/2006 |
| JP | 2007027474 | A | 2/2007 |
| JP | 2007135008 | A | 5/2007 |
| JP | 3139842 | U | 3/2008 |
| JP | 2008093648 | A | 4/2008 |
| JP | 2008261646 | A | 10/2008 |
| JP | 2009-270639 | A | 11/2009 |
| JP | 2010284616 | A | 12/2010 |
| JP | 2011171894 | A | 9/2011 |
| JP | 2012191619 | A | 10/2012 |
| KR | 1995-0005465 | Y1 | 7/1995 |
| KR | 20120064704 | A | 6/2012 |
| KR | 20140144679 | A | 12/2014 |
| KR | 10-1737498 | | 5/2017 |
| KR | 10-2022-0085769 | A | 6/2022 |
| WO | 1998048855 | A1 | 11/1998 |
| WO | 2000023861 | A1 | 4/2000 |
| WO | 2000053983 | A1 | 9/2000 |
| WO | 2006028572 | A2 | 3/2006 |
| WO | 2007019337 | A2 | 2/2007 |
| WO | 2007033493 | A1 | 3/2007 |
| WO | 2008073051 | A1 | 6/2008 |
| WO | 2009087102 | A2 | 7/2009 |
| WO | 2010070551 | A1 | 6/2010 |
| WO | 2011145555 | A1 | 11/2011 |
| WO | 2013116599 | A1 | 8/2013 |
| WO | 2014153007 | A1 | 9/2014 |
| WO | 2015171967 | A1 | 11/2015 |
| WO | 2016014818 | A1 | 1/2016 |
| WO | 2017218832 | A1 | 12/2017 |
| WO | 2019094936 | A1 | 5/2019 |

OTHER PUBLICATIONS

Office Action dated Oct. 1, 2020 in connection with Canadian Application No. 3,050,379, 4 pages.
Lucio, Valentino, "A Solution for Soaked Cells", San Antonio Express-News, pp. 1-3, Oct. 19, 2011.
Cooper, Sean, "Drybox Rescue Station: the ultimate cellphone drying system (hands-on)", www.engadget.com, pp. 1-13, May 22, 2013.
DRYBOX The New Way to Save a Wet Phone Fast, http://www.dryboxrescue.com/, pp. 1-5, Aug. 26, 2013.
International Search Report and Written Opinion dated Feb. 24, 2014 issued in International Application No. PCT/US2013/070178.
International Preliminary Report on Patentability dated Aug. 14, 2014 issued in International Application No. PCT/US2013/024277.
Final Office Action dated Sep. 3, 2014 issued in U.S. Appl. No. 14/080,595.
Non-Final Office Action dated Sep. 20, 2013 issued in U.S. Appl. No. 13/756,879.
Final Rejection dated Feb. 28, 2014 issued in U.S. Appl. No. 13/756,879.
Advisory Action dated Jun. 18, 2014 issued in U.S. Appl. No. 13/756,879.
Advisory Action dated Jul. 9, 2014 issued in U.S. Appl. No. 13/756,879.
Non-Final Rejection dated Feb. 28, 2014 issued in U.S. Appl. No. 14/080,595.
International Search Report and Written Opinion dated Aug. 27, 2014 issued in International Application No. PCT/US2014/028634.
Notice of Allowance dated Jan. 20, 2015 issued in U.S. Appl. No. 13/756,879.
Non-Final Rejection dated Sep. 20, 2014 issued in U.S. Appl. No. 13/756,879.
International Search Report and Written Opinion dated Oct. 28, 2014 issued in International Application No. PCT/US2014/046151.
Non-Final Office Action dated Apr. 10, 2015 issued in U.S. Appl. No. 14/080,595.
International Preliminary Report on Patentability dated May 28, 2015 issued in International Application No. PCT/US2013/070178.
Demand and Article 34 Amendments dated Jan. 14, 2015 issued in International Application No. PCT/US2014/028634.
International Preliminary Report on Patentability dated Apr. 15, 2015 issued in International Application No. PCT/US2014/028634.
Extended European Search Report dated Jun. 12, 2015 issued in European Application No. 13744398.2.
Non-Final Office Action dated Nov. 23, 2015 issued in U.S. Appl. No. 14/080,705.
First Examination Report dated Jun. 8, 2015 issued in Chinese Patent Application No. 201380016934.8.
Non-Final Office Action dated Sep. 1, 2015 issued in U.S. Appl. No. 14/213,142.
Office Action dated Oct. 23, 2015 issued in Colombian Patent Application No. 14189.782.
Non-Final Office Action dated Jan. 29, 2016 issued in U.S. Appl. No. 14/080,595.
MacVittie, Lori, "Remote Management In-Reach", Network Computing, 14, 16; ProQuest p. 22, Aug. 21, 2003.
International Search Report and Written Opinion dated May 15, 2013, issued in PCT/US2013/024277.
How to Dry Out a Wet Cell Phone, ehow.com, http://www.ehow.com/pringhow_2042819_dry-out-wet-cll-phone.html, pp. 1-2, Jun. 5, 2013.
U.S. Trademark Registration No. 4,280,438 for the mark DRYBOX, Jan. 22, 2013.
Exhibitor News dated May 3, 2013 from International CTIA Wireless 2012.
EPO Public Patent Application Information File Wrapper for EP Patent Application No. 13744398.2, downloaded from http://www.epo.gov on May 17, 2017.
Office Action with English Translation, Japanese Patent Application No. 2014-555734, dated Feb. 7, 2017.
Global Dossier Patent Application Information File Wrapper for AU 2013214941, dated Oct. 7, 2016.
Substrate definition from Internet dated 2015.
Intemational Preliminary Report on Patentability issued in PCT/US2013/024277, May 8, 2014.
Intemational Preliminary Report on Patentability issued in PCT/US2013/070178, May 19, 2015.
Intemational Preliminary Report on Patentability issued in PCT/US2015/029797, Nov. 8, 2016.
Intemational Preliminary Report on Patentability issued in PCT/US2014/046151, Jan. 12, 2015.
Intemational Preliminary Report on Patentability issued in PCT/US/2013/000239, Aug. 5, 2014.
Intemational Search Report and Written Opinion issued in PCT/US2015/028634, Apr. 29, 2016.
First Office Action with English translation, Chinese Application No. 201380016934.8, dated Jun. 25, 2015, 19 pages.
Second Office Action with English translation, Chinese Application No. 201380016934.8, dated Apr. 19, 2016, 8 pages.
Notification to Grant Patent Right for Invention with English translation, Chinese Application No. 201380016934.8, dated Sep. 29, 2016, 4 pages.
Demand and Article 34 Amendments dated Oct. 24, 2014 issued in International Application No. PCT/US2013/000239.
"How Can I Fix My Cell Phone—It Got Wet", www.howtospoter.com/general/how-can-i-fix-my-cell-phone-it-got-wet, Apr. 21, 2007.
"How to Save a Wet Cell Phone"; WikiHow, www.wikihow.com/Save-a-Wet-Cell-Phone, Jul. 1, 2008.
"How to Save a Wet Cell Phone"; XHotmail, www.instructables.com/id/How-to-Save-a-Wet-Cell-Phone/?ALLSTEPS, Sep. 1, 2007.
"How to Save Your Wet Cell Phone-Tech Clinic", Popular Mechanics, www.popularmechanics.com/technology/how-to/ips/4269047/, Jul. 1, 2008.
Non-Final Office Action dated Feb. 12, 2024 in connection with U.S. Appl. No. 18/228,504, 4 pages.

(56) References Cited

OTHER PUBLICATIONS

International Search Report and Written Opinion dated Feb. 28, 2024 in connection with International Patent Application No. PCT/US2023/036798, 12 pages.
Supplementary European Search Report dated Oct. 24, 2023 in connection with European Patent Application No. 20865608.2, 11 pages.
European Search Report dated Nov. 23, 2023 in connection with European Patent Application No. 23177384.7, 7 pages.
Extended European Search Report dated Nov. 15, 2023 in connection with EP application No. 23177384.7, 6 pages.
Notice of Preliminary Rejection dated Oct. 16, 2023, in connection to KR Application No. 10-2023-7004951, 11 pages (no translation).
"Saving a wet cell phone with dry rice . . . Holy crap, it actually works!", http://openattitude.com/2011/04/12/saving-a-wet-cell-phone-with-dry-rice-holy-crap-it-actually-works/, Apr. 21, 2011.
"Frugal Fix: Revive your Cell Phone or Electronic Devices from Water Damage", http://www.fiscalgeek.com/2009/06/ff_water_damaged_cellphone/, Jun. 2009.
Office Action issued in Eurasian Patent Application No. 201491450, Jul. 25, 2016.
Notification on Readiness to Grant Patent issued in Eurasian Patent Application No. 201491450, May 18, 2017.
Canadian Examiner Requisition dated May 31, 2017 in connection with Canadian Application No. 2,863,649, 4 pages.
Eurasian Notification of Readiness to Grant a Eurasian Patent dated Aug. 28, 2017 in connection with Eurasian Application No. 201491450/31, 3 pages.
Examination Report dated Oct. 4, 2017 in connection with Australian Application No. 2013214941, 4 pages.
TESS search of Bluetooth dated Sep. 22, 2017.
TESS Bluetooth trademark status dated Sep. 22, 2017.
TESS WiFi search dated Sep. 22, 2017.
TESS WiFi trademark status dated Sep. 22, 2017.
Canadian Examiner Requisition dated Dec. 11, 2017 in connection with Canadian Application No. 2,863,649, 4 pages.
Office Action dated Jul. 2, 2016 issued in Colombian Patent Application No. 14189782.
Office Action dated Jul. 7, 2017 issued in Mexican Patent Application No. 2014/009259.
Office Action dated Dec. 21, 2017 issued in EP Patent Application No. 13744398.2.
Office Action dated Jun. 19, 2018 issued in Canadian Application No. 2,863,649, 4 pages.
Decision of Rejection dated Jan. 9, 2018 in connection with Japanese Application No. 2014-555734, 4 pages.
Office Action dated Feb. 7, 2019 in connection with U.S. Appl. No. 15/651,391.
First Office Action dated Oct. 25, 2018 in connection with Chinese Application No. 201611154278.X, 28 pages.
Extended European Search Report dated Feb. 5, 2019 in connection with European Application No. 18205789.3, 6 pages.
Korean Office Action dated Mar. 12, 2019 in connection with Korean Application No. 10-2014-7024141, 16 pages.
Korean Office Action dated Sep. 10, 2019 in connection with Korean Application No. 10-2014-7024141, 7 pages.
Indian Examination Report dated May 7, 2019 in connection with Indian Application No. 6535/DELNP/2014, 7 pages.
Japanese Notice of Reasons of Refusal dated May 28, 2019 in connection with Japanese Application No. 2018-089626, 6 pages.
Chinese Office Action dated Jun. 13, 2019 in connection with Chinese Application No. 201611154278.X, 10 pages.
International Search Report and Written Opinion of the International Searching Authority dated Mar. 8, 2019 in connection with International Application No. PCT/US2018/060753, 12 pages.
Office Action dated Feb. 11, 2020 in connection with European Application No. 18205789.3, 4 pages.
Office Action dated Feb. 7, 2020 in connection with Chinese Application No. 201611154278.X, 7 pages.
Examination Report dated Jan. 19, 2017 in connection with EP Patent Application 13744398.2, 4 pages.
Examination Report dated Jan. 21, 2020 in connection with Indian Application No. 201617004673, 6 pages.
Extended European Search Report dated Mar. 23, 2017 in connection with European Application No. 14822876.0, 8 pages.
Notice of Preliminary Rejection dated Apr. 22, 2024 in connection with Korean Patent Application No. 10-2020-7016794, 9 pages.
Notice of Reasons for Refusal Office Action dated Feb. 20, 2024 in connection with Japanese Patent Application No. 2023-017666, 23 pages.
Japanese Notice of Reasons for Refusal, dated Aug. 6, 2024 in connection with Japanese Application No. 2022-517414, 10 pages.

* cited by examiner

METHODS AND APPARATUSES FOR DRYING ELECTRONIC DEVICES

CROSS-REFERENCE TO RELATED APPLICATIONS

This application is a continuation-in-part of U.S. application Ser. No. 18/228,504, filed on Jul. 31, 2023, which is a continuation of U.S. application Ser. No. 17/134,492, filed on Dec. 27, 2020, issued as U.S. Pat. No. 11,713,924, which is a continuation of U.S. application Ser. No. 16/854,862, filed on Apr. 21, 2020, issued as U.S. Pat. No. 10,876,792, the disclosures of which are incorporated herein by reference in their entirety for all purposes.

This application also claims priority to U.S. Provisional Application No. 63/422,838, filed Nov. 4, 2022, the disclosures of which is incorporated herein by reference in its entirety for all purposes.

TECHNICAL FIELD

Embodiments of the present disclosure generally relate to the repair of electronic devices, and to the repair of electronic devices that have been rendered at least partially inoperative due to moisture intrusion.

Embodiments of the present disclosure also generally relate to apparatuses and methods for drying electronics and non-electronic objects, particularly devices that are subject to high-humidity conditions of the human body such as hearing amplification electronics, smart watches, blood sugar detection meters, and electronic rings.

BACKGROUND OF THE DISCLOSURE

Electronic devices are frequently manufactured using ultra-precision parts for tight fit and-finish dimensions that are intended to keep moisture from entering the interior of the device. Many electronic devices are also manufactured to render disassembly by owners and or users difficult without rendering the device inoperable even prior to drying attempts. With the continued miniaturization of electronics and increasingly powerful computerized software applications, it is commonplace for people today to carry multiple electronic devices, such as portable electronic devices. Cell phones are currently more ubiquitous than telephone land lines, and many people, on a daily basis throughout the world, inadvertently subject these devices to unintended contact with water or other fluids. This occurs daily in, for example, bathrooms, kitchens, swimming pools, lakes, washing machines, or any other areas where various electronic devices (e.g., small, portable electronic devices) can be submerged in water or subject to high humid conditions. These electronic devices frequently have miniaturized solid-state transistorized memory for capturing and storing digitized media in the form of phone contact lists, e-mail addresses, digitized photographs, digitized music and the like.

Moreover, with the advent of the miniaturization of wireless transceiver electronics there has been an explosion of new types of devices that aid human beings in everyday life through the transmission of data. There has been significant strides in smart phone headsets, hearing aids, smart watches, and finger rings which are worn on the human body and all subjected to constant humidity bombardment, often in excess of 95% from the natural perspiration process that maintains human homeostasis.

In the case of hearables residing in the ear canal and over the ear, the desire is to have these devices weigh as little as possible and be durable. The combination of durability and light weight requires the assembly of these devices using the strongest plastics (e.g. ABS, polycarbonate, acrylic) which all have the undesired property of being hygroscopic, or, readily absorbing water. This property causes significant moisture uptake within hearables due to the constant evaporation of perspiration with the device resting on the skin.

In addition, rechargeable batteries are the preferred method of powering such devices and are often encased within the device which is constantly absorbing water. This leads to unintentional battery shorts and the premature draining of the batteries.

Some wearable devices, such as hearing aids, use sophisticated micro-mechanical electronic mechanisms (MEMs) and diaphragms for the microphones. Heat and vacuum pressure can have a deleterious effect on these components and therefore, a new type of drying system is required.

SUMMARY OF THE DISCLOSURE

At least one of the embodiments described herein includes an apparatus and method having features that provide a better, more consistent treatment for the removal of water/perspiration in wearable electronic devices. Any embodiment's elements or features described herein may be combined with another embodiment's elements or features.

One embodiment includes providing a drying chamber for receiving an electronic device in the drying chamber, wherein at least one air valve is configured to engage the drying chamber, wherein at least one sensor is positioned with respect to the at least one air valve, wherein at least one exhaust channel is configured to be engaged by the at least one air valve, wherein at least one moisture-absorbing substance is connected to the at least one air valve, wherein at least one pressure-generating device is connected to the at least one air valve, wherein at least one controller is connected to at least one of the at least one air valve, the at least one pressure-generating device, and the at least one moisture-absorbing substance, wherein at least one computing device provides instructions for the at least one controller; initiating, using the at least one controller, based on a first instruction received from the at least one computing device, a calibration process, wherein the calibration process comprises: positioning or maintaining, using the at least one controller, the at least one air valve in a calibration position, wherein, in the calibration position, the at least one air valve disengages or continues to disengage from the drying chamber, generating, using the at least one pressure-generating device, a first airflow, associated with a pressure, wherein the first airflow flows, on a first air path, from the at least one pressure-generating device into the at least one moisture-absorbing substance, thereby resulting in a second airflow, wherein the second airflow flows, on a second air path, from the at least one moisture-absorbing substance into the at least one air valve, and then from the at least one air valve into the at least one pressure-generating device, sensing, using the at least one sensor, a first moisture-based parameter of the second airflow, and executing, using the first moisture-based parameter, a first computation, thereby producing a first computation result based on a first condition; in response to the first computation result meeting the first condition: initiating, using the at least one controller, based on a second instruction received from the at least one computing device, a regeneration process, wherein the regeneration process comprises: positioning or maintaining, using the at least one controller, the at least one air valve in a regeneration position, wherein, in the regeneration position, the at least one air valve engages or continues to engage the at least one exhaust channel, drying the at least one moisture-absorbing substance, generating, using the at least one pressure-generating device, the first airflow, associated with the pressure, wherein the first airflow flows, on the first air path, thereby resulting in a third airflow, wherein the third airflow flows, on a third air path, from the at least one moisture-absorbing substance into the at least one air valve, and then from the at least one air valve into the at least one exhaust channel, sensing, using the at least one sensor, a second moisture-based parameter of the third airflow, and executing, using the second moisture-based parameter, a second computation, thereby producing a second computation result based on a second condition; and in response to the second computation result not meeting the second condition: re-initiating, using the at least one controller, based on the second instruction received from the at least one computing device, the regeneration process until the second computation result meets the second condition.

Another embodiment further comprises, in response to the second computation result meeting the second condition: storing, using the at least one computing device, the second computation result, and initiating, using the at least one controller, based on a third instruction received from the at least one computing device, a drying process, wherein the drying process comprises: positioning or maintaining, using the at least one controller, the at least one air valve to a drying position, wherein, in the drying position, the at least one air valve engages or continues to engage with the drying chamber, thereby creating a closed loop for air flow, generating, using the at least one pressure-generating device, the first airflow, associated with the pressure, wherein the first airflow flows, on the first air path, thereby resulting in a fourth airflow, wherein the fourth airflow flows, on a fourth air path, from the at least one moisture-absorbing substance into the at least one air valve, and then from the at least one air valve into the drying chamber, and then from the at least one air valve into the at least one pressure-generating device, sensing, using the at least one sensor, a third moisture-based parameter of the fourth airflow, and executing, using the third moisture-based parameter, a third computation, thereby producing a third computation result based on a third condition; and in response to the third computation result not meeting the third condition: re-initiating, using the at least one controller, based on the third instruction received from the at least one computing device, the drying process until the third computation result meets the third condition.

Another embodiment further entails, wherein the at least one sensor comprises an input sensor and an output sensor, wherein the fourth airflow comprises a fourth input airflow and a fourth output airflow, wherein the fourth input airflow impinges on the input sensor and the fourth output airflow impinges on the output sensor, wherein the third moisture-based parameter comprises a third input moisture-based parameter and a third output moisture-based parameter, wherein the third input-moisture-based parameter is produced by the input sensor and the third output moisture-based parameter is produced by the output sensor, wherein the third computation comprises comparing the third input moisture-based parameter and the third output moisture-based parameter, wherein the third condition comprises the third input moisture-based parameter and the third output moisture-based parameter being substantially equal.

Another embodiment further entails, wherein the third condition comprises the third input moisture-based parameter and the third output moisture-based parameter having a percentage difference less than 1% difference.

Another embodiment further comprising, in response to the first computation result not meeting the first condition, initiating, using the at least one controller, based on the third instruction received from the at least one computing device, the drying process; and in response to the third computation result not meeting the third condition: re-initiating, using the at least one controller, based on the third instruction received from the at least one computing device, the drying process until the third computation result meets the third condition.

Another embodiment further entails, wherein the first computation comprises comparing the first moisture-based parameter to a threshold, wherein the first condition comprises the first moisture-based parameter being greater than the threshold, wherein the second computation comprises comparing the second moisture-based parameter to the threshold, wherein the second condition comprises the second moisture-based parameter being less than or equal to the threshold.

Another embodiment further entails, wherein the threshold is substantially equal to 20% relative humidity, wherein drying the at least one moisture-absorbing substance comprises heating the at least one moisture-absorbing substance, wherein positioning the at least one air valve comprises rotating the at least one air valve, wherein the at least one air valve is further configured to permit rotation, wherein the at least one air valve rotates into multiple positions, wherein the at least one air valve utilizes a rack system for rotating, wherein the rack system utilizes a pinion gear to rotate the at least one air valve, wherein the at least one air valve is coupled with a printed circuit board.

Another embodiment further entails, wherein the printed circuit board comprises: the at least one sensor; one or more openings, thereby permitting air flow impingement on the at least one sensor; a microcontroller; a motor driver; a fan driver; a heater control circuit; one or more optical reflective sensors; and one or more hall effect sensors.

Another embodiment further entails, wherein at least one gear assembly connects the at least one air valve to the drying chamber, wherein the at least one gear assembly comprises a subminiature type N20 gearmotor, wherein at least one moisture-absorbing subassembly comprises the at least one moisture-absorbing substance and the at least one pressure-generating device, wherein the at least one moisture-absorbing subassembly is outside the drying chamber, wherein the at least one moisture-absorbing subassembly is further configured to create a closed loop for air flow when engaged with the drying chamber, wherein the drying chamber utilizes an elastomeric seal, wherein the drying chamber utilizes a twist-lock system, wherein the at least one air valve is manufactured with elastomeric material, wherein the pressure comprises static pressure of at least 0.1 inch $H_2O$ and at most 0.3 inch $H_2O$, wherein the moisture-absorbing substance produces dry air with relative humidity of at least 5% and no more than 20%, wherein the moisture-absorbing substance is able to withstand a temperature of at least 190 degrees F. and no more than 225 degrees F., wherein the first airflow, the second airflow, the third airflow, and the fourth airflow have a flow rate of at least 2 CFM and no more than 4 CFM, wherein the first air path, the second air path, and the fourth air path have a temperature substantially equal to room ambient temperature, wherein the second airflow, the third airflow, the fourth airflow have a humidity less than 20% relative humidity as it leaves the at least one moisture-absorbing sub stance.

Another embodiment comprising: a drying chamber, for receiving an electronic device; at least one air valve, wherein the at least one air valve is configured to engage the drying chamber; at least one sensor, wherein the at least one sensor is positioned with respect to the at least one air valve; at least one exhaust channel, wherein the at least one exhaust channel is configured to be engaged by the at least one air valve; at least one moisture-absorbing substance, wherein the at least one moisture-absorbing substance is connected to the at least one air valve; at least one pressure-generating device, wherein the at least one pressure-generating device is connected to the at least one air valve; at least one controller, wherein the at least one controller is connected to at least one of the at least one air valve, the at least one pressure-generating device, and the at least one moisture-absorbing substance; and at least one computing device, wherein the at least one computing device provides the at least one controller a first instruction configured to execute a calibration process, a second instruction configured to execute a regeneration process, and a third instruction configured to execute a drying process, wherein the calibration process comprises: positioning or maintaining, using the at least one controller, the at least one air valve in a calibration position, wherein, in the calibration position, the at least one air valve disengages or continues to disengage from the drying chamber, generating, using the at least one pressure-generating device, a first airflow, associated with a pressure, wherein the first airflow flows, on a first air path, from the at least one pressure-generating device into the at least one moisture-absorbing substance, thereby resulting in a second airflow, wherein the second airflow flows, on a second air path, from the at least one moisture-absorbing substance into the at least one air valve, and then from the at least one air valve into the at least one pressure-generating device, sensing, using the at least one sensor, a first moisture-based parameter of the second airflow, and executing, using the first moisture-based parameter, a first computation, thereby producing a first computation result based on a first condition, wherein the regeneration process comprises: positioning or maintaining, using the at least one controller, the at least one air valve in a regeneration position, wherein, in the regeneration position, the at least one air valve engages or continues to engage the at least one exhaust channel, drying the at least one moisture-absorbing substance, generating, using the at least one pressure-generating device, the first airflow, associated with the pressure, wherein the first airflow flows, on the first air path, thereby resulting in a third airflow, wherein the third airflow flows, on a third air path, from the at least one moisture-absorbing substance into the at least one air valve, and then from the at least one air valve into the at least one exhaust channel, sensing, using the at least one sensor, a second moisture-based parameter of the third airflow, and executing, using the second moisture-based parameter, a second computation, thereby producing a second computation result based on a second condition, wherein the drying process comprises: positioning or maintaining, using the at least one controller, the at least one air valve to a drying position, wherein, in the drying position, the at least one air valve engages or continues to engage with the drying chamber, thereby creating a closed loop for air flow, generating, using the at least one pressure-generating device, the first airflow, associated with the pressure, wherein the first airflow flows, on the first air path, thereby resulting in a fourth airflow, wherein the fourth airflow flows, on a fourth air path, from the at least one moisture-absorbing substance into the at least one air valve, and then from the at least one air valve into the drying chamber, and then from the at least one air valve into the at least one pressure-generating device, sensing, using the at least one sensor, a third moisture-based parameter of the fourth airflow, and executing, using the third moisture-based parameter, a third computation, thereby producing a third computation result based on a third condition.

Another embodiment further entails, wherein the at least one sensor comprises an input sensor and an output sensor, wherein the fourth airflow comprises a fourth input airflow and a fourth output airflow, wherein the fourth input airflow impinges on the input sensor and the fourth output airflow impinges on the output sensor, wherein the third moisture-based parameter comprises a third input moisture-based parameter and a third output moisture-based parameter, wherein the third input-moisture-based parameter is produced by the input sensor and the third output moisture-based parameter is produced by the output sensor, wherein the third computation comprises comparing the third input moisture-based parameter and the third output moisture-based parameter, wherein the third condition comprises the third input moisture-based parameter and the third output moisture-based parameter being substantially equal.

Another embodiment further entails, wherein the third condition comprises the third input moisture-based parameter and the third output moisture-based parameter having a percentage difference less than 1% difference, wherein the calibration process further comprises: in response to the first computation result not meeting the first condition: initiating, using the at least one controller, based on the third instruction received from the at least one computing device, the drying process; and in response to the third computation result not meeting the third condition: re-initiating, using the at least one controller, based on the third instruction received from the at least one computing device, the drying process until the third computation result meets the third condition.

Another embodiment further entails wherein the first computation comprises comparing the first moisture-based parameter to a threshold, wherein the first condition comprises the first moisture-based parameter being greater than the threshold, wherein the second computation comprises comparing the second moisture-based parameter to the threshold, wherein the second condition comprises the second moisture-based parameter being less than or equal to the threshold, wherein the threshold is substantially equal to 20% relative humidity, wherein drying the at least one moisture-absorbing substance comprises heating the at least one moisture-absorbing substance, wherein positioning the at least one air valve comprises rotating the at least one air valve, wherein the at least one air valve is further configured to permit rotation, wherein the at least one air valve rotates into multiple positions, wherein the at least one air valve utilizes a rack system for rotating, wherein the rack system utilizes a pinion gear to rotate the at least one air valve, wherein the at least one air valve is coupled with a printed circuit board.

Another embodiment further entails, wherein the printed circuit board comprises: the at least one sensor; one or more openings, thereby permitting air flow impingement on the at least one sensor; a microcontroller; a motor driver; a fan driver; a heater control circuit; one or more optical reflective sensors; and one or more hall effect sensors.

Another embodiment further entails, wherein at least one gear assembly connects the at least one air valve to the drying chamber, wherein the at least one gear assembly comprises a subminiature type N20 gearmotor, wherein at least one moisture-absorbing subassembly comprises the at least one moisture-absorbing substance and the at least one pressure-generating device, wherein the at least one moisture-absorbing subassembly is outside the drying chamber, wherein the at least one moisture-absorbing subassembly is further configured to create a closed loop for air flow when engaged with the drying chamber, wherein the drying chamber utilizes an elastomeric seal, wherein the drying chamber utilizes a twist-lock system, wherein the at least one air valve is manufactured with elastomeric material, wherein the pressure comprises static pressure of at least 0.1 inch $H_2O$ and at most 0.3 inch $H_2O$, wherein the moisture-absorbing substance produces dry air with relative humidity of at least 5% and no more than 20%, wherein the moisture-absorbing substance is able to withstand a temperature of at least 190 degrees F. and no more than 225 degrees F., wherein the first airflow, the second airflow, the third airflow, and the fourth airflow have a flow rate of at least 2 CFM and no more than 4 CFM.

Another embodiment further entails, wherein the first air path, the second air path, and the fourth air path have a temperature substantially equal to room ambient temperature, wherein the second airflow, the third airflow, the fourth airflow have a humidity less than 20% relative humidity as it leaves the at least one moisture-absorbing substance.

Another embodiment comprises: at least a first airtight drying chamber; a rotary air valve; a gearmotor; a pressure-generating device; a moisture-absorbing substance; a computer control means; a dryer assembly, the dryer rotary valve is fabricated to permit multiple rotational ports in a single polymeric valve, wherein the air tight drying chamber utilizes an elastomeric seal of between 7 and 20 inches in circumferential length, wherein the air tight drying chamber utilizes a twist-lock mechanism, wherein the rotary air valve is 100% molded from an elastomeric material, wherein the rotary air valve can have a number of air flow switching ports during rotation, wherein the rotary air valve incorporates a rack mechanism to provide rotational force, wherein the rotary air valve rack mechanism utilizes a pinion gear to rotate the rotary valve, wherein the rotary air valve is mated to a printed circuit board, wherein the printed circuit board contains a microcontroller, a motor driver, a fan driver, humidity sensors, a heater control circuit, hall effect and/or optical reflective sensors, wherein the printed circuit board contains through holes to permit air flow impingement on humidity sensors, wherein the gearmotor is a subminiature type N20 with a torque rating of between 1 and 20 inch ounces, wherein the pressure-generating device produces at least 0.1 inch H2O and not more than 0.3 inch H2O of static pressure, wherein the pressure-generating device produces static pressure within a closed loop air flow path for drying purposes, wherein the moisture-absorbing substance produces dry air with relative humidity of between 5% and 20% using desiccant, wherein the moisture-absorbing substance is heated to at least 190 F and not more than 225 F to dry desiccant material.

BRIEF DESCRIPTION OF THE DRAWINGS

Some of the figures shown herein may include dimensions or may have been created from scaled drawings. However, such dimensions, or the relative scaling within a figure, are by way of example only, and not to be construed as limiting the scope of this disclosure.

DESCRIPTION OF THE ILLUSTRATED EMBODIMENTS

Figure 1:
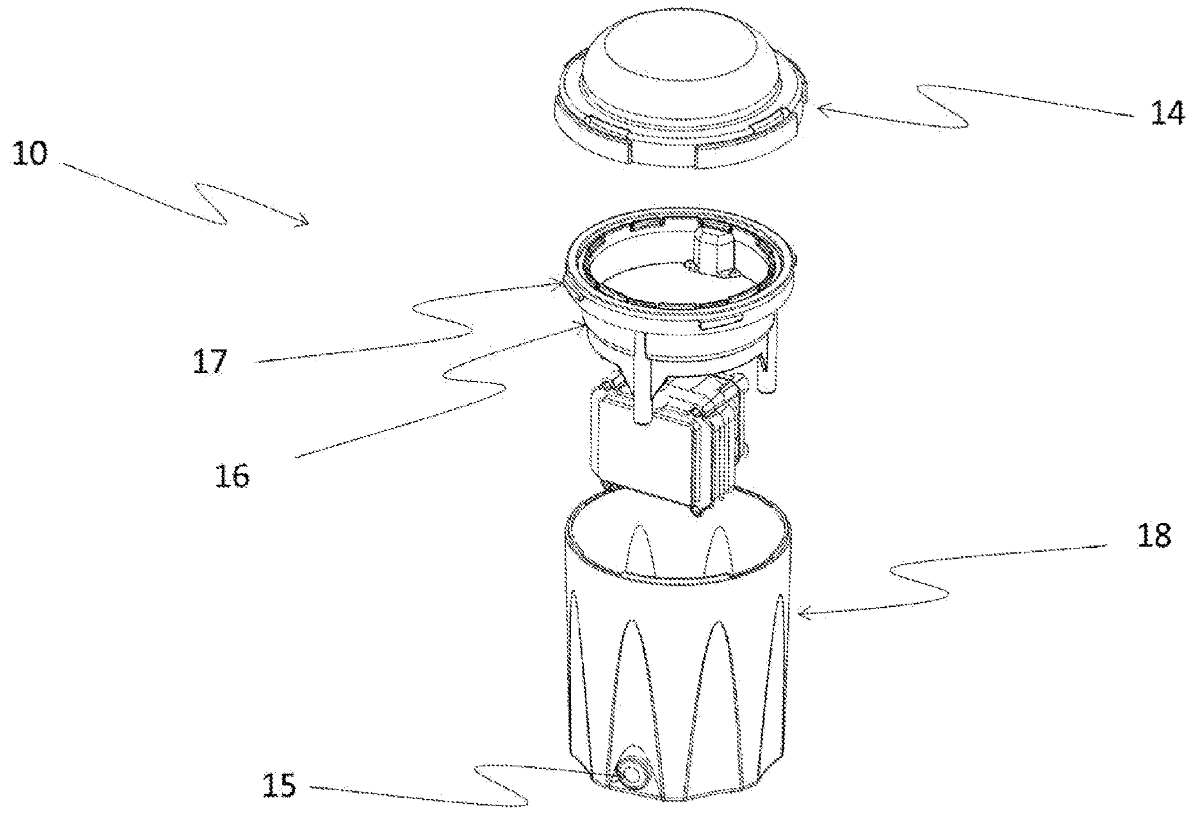
FIG. 1 shows an exploded perspective view of a dryer.

Methods and apparatuses for drying electronic devices and non-electronic objects are disclosed. Embodiments include methods and apparatuses that utilized a closed-loop air path. Some embodiments control the amount of dry air that is impinged on an electronic device and non-electronic objects that holds moisture. In such embodiments, the dry air that is statically pressurized. Still other embodiments include, using an air valve that is configured to rotate and coupled with a printed circuit board, to switch between multiple plenums. In such embodiments, the air valve is rotated in response to instructions configured to execute a calibration process, drying process, or regeneration process. Further still, in such embodiments, the instructions are provided in response to feedback provided by one or more sensors to control the moisture absorption occurring within a closed loop.

For the purposes of promoting an understanding of the principles of the disclosure, reference is made to selected embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in detail, although it will be apparent to those skilled in the relevant art that some features or some combinations of features may not be shown for the sake of clarity.

Any reference to "disclosure" within this document is a reference to an embodiment of a family of disclosures, with no single embodiment including features that are necessarily included in all embodiments, unless otherwise stated. Furthermore, although there may be references to "advantages" provided by some embodiments of the present disclosure, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure include devices and equipment generally used for drying materials using dry air. Embodiments include methods and apparatuses for drying electronic devices that have been subjected to high humidity conditions. At least one embodiment provides a pressure-generating device within a closed air path where static pressure generated by the pressure-generating device creates an airflow through a moisture-absorbing substance, an air valve, and a drying chamber, thereby subjecting an electronic device housed in the drying chamber to dry air. The pressure-generating device, moisture-absorbing substance, and air valve may be in various sizes. In some embodiments, the air valve's ports may be 25 mm in diameter. The drying chamber may further be in various sizes and also compatible with multiple sizes of pressure-generating devices, moisture-absorbing substances, and air valves. In some embodiments the drying chamber can be comparable in size to a suitcase. The closed air path may be further provided by a sealed drying chamber. In some embodiments, a multi-positional air valve, including but not limited to rotary or sliding air valves, may permit various stages or modes in drying materials. Embodiments may utilize various power sources including but not limited to 12V DC power sources found in vehicles such as cars, boats, or recreational vehicles.

FIG. 1 shows a perspective front view of a first exemplary embodiment of a dryer 10, with chamber lid 14, drying chamber subassembly 16, lower housing 18, and start-stop switch 15. In some embodiments, start stop switch 15 can be a tactical feel membrane switch with integrated LEDs for dryer condition visual feedback (e.g. calibration, regeneration, or drying modes). Chamber lid 14 and drying chamber subassembly 16 are mated together through twist-lock features 17.

Figure 2:
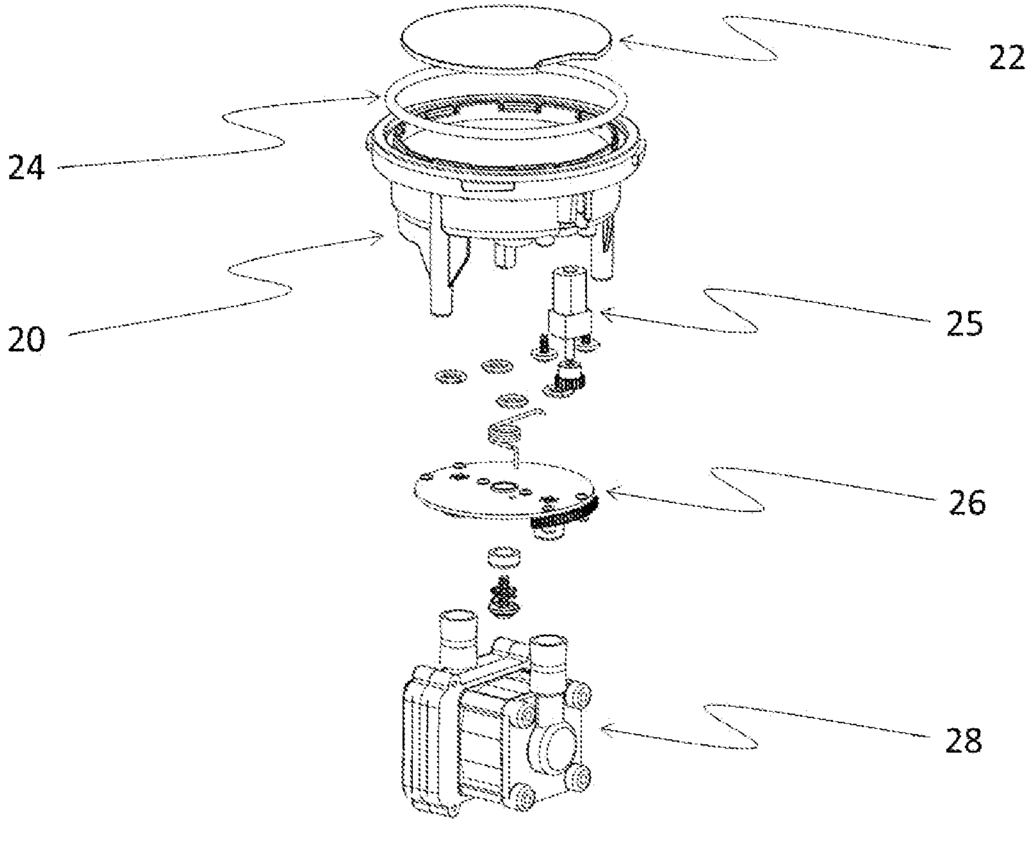
FIG. 2 shows an exploded perspective view of the main components of a dryer.

As best shown in FIG. 2, chamber 20 utilizes chamber O-ring 24 to seal against chamber lid 14 of FIG. 1. Bypass seal plate 22 is firmly attached to the interior bottom of chamber 20 using ultrasonic welding, plastic glue, or equivalent. Gearmotor 25 which is mounted to chamber 20 is depicted with air valve and sensor subassembly 26 together with pressure-generating device and moisture-absorbing substance subassembly 28.

Figure 3:
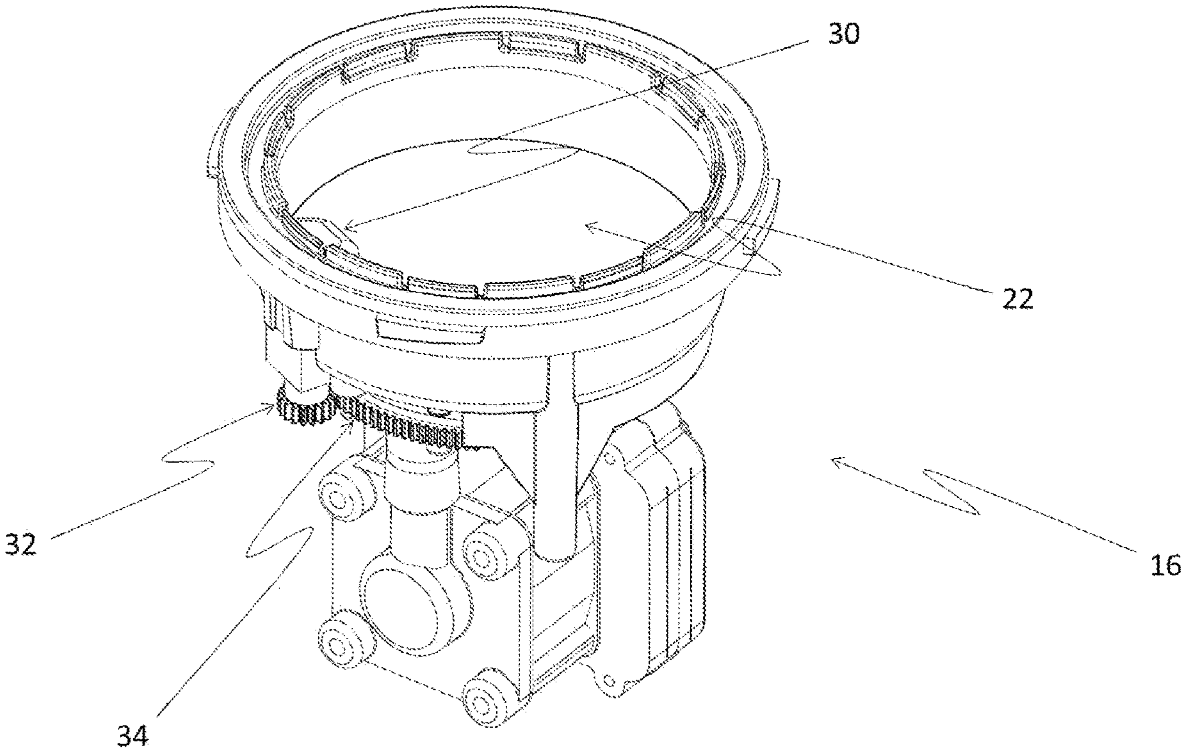
FIG. 3 shows a top perspective view of a drying chamber subassembly and a pressure-generating device subassembly of a dryer of FIG. 1.

Referring now to FIG. 3, drying chamber subassembly 16 of FIG. 1 is shown with bypass seal plate 22, gearmotor mounting pocket 30, pinion gear 32, and valve pinion rack 34. Pinion gear 32 is permanently mounted to output shaft of gearmotor 25 of FIG. 2 and is mated with valve pinion rack 34. Gearmotor 25, when powered, can provide rotational force onto valve pinion rack 34 and therefore translate valve pinion rack 34 into rotational movement.

Figure 4:
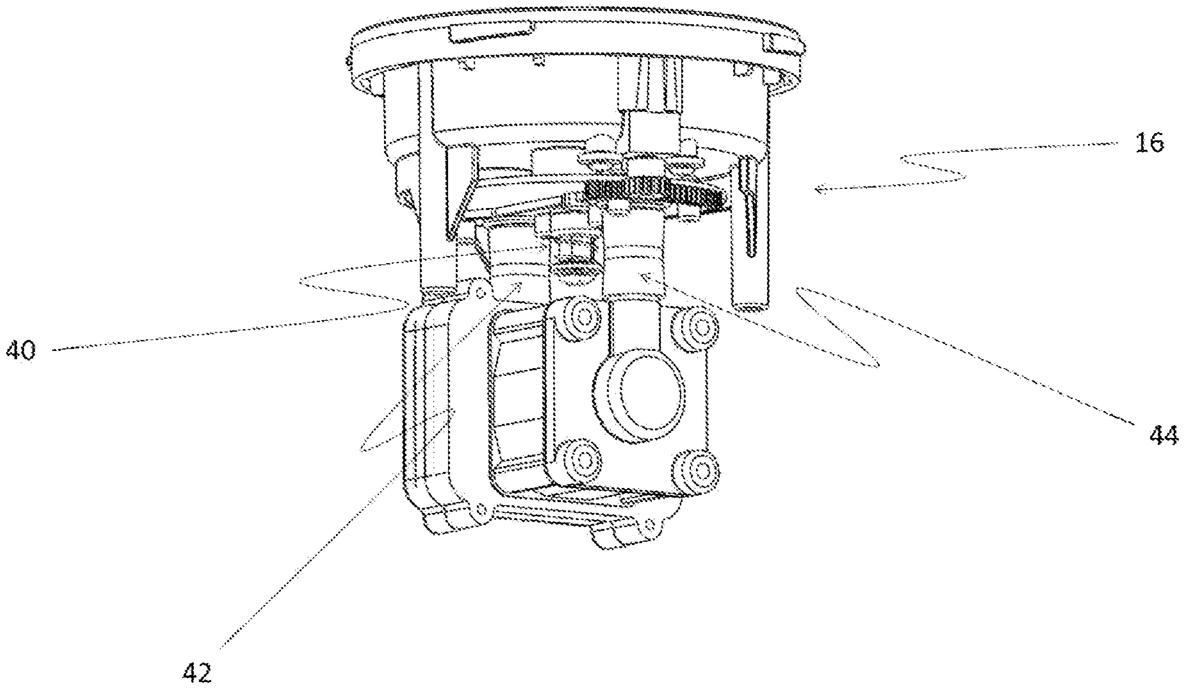
FIG. 4 shows a bottom perspective view of a drying chamber subassembly and a pressure-generating device subassembly of a dryer of FIG. 1.
Figure 5:
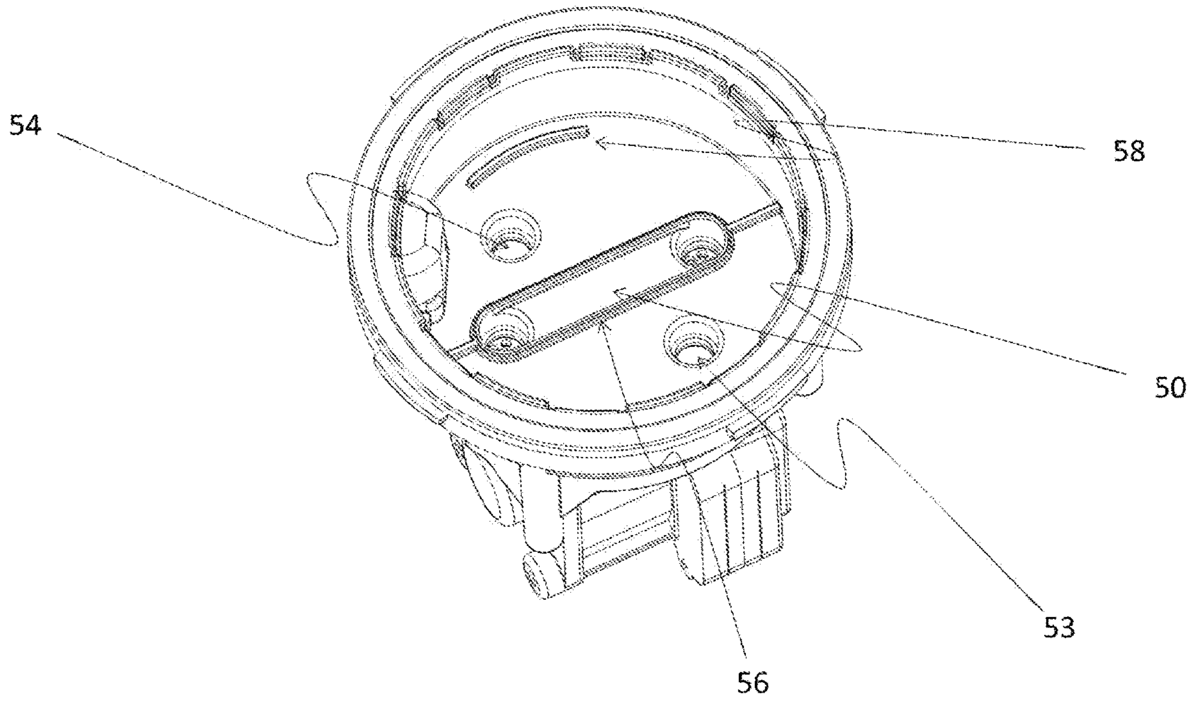
FIG. 5 shows a top perspective view of a drying chamber contemplated in a dryer.

FIG. 4 which is a bottom perspective view of drying chamber subassembly 16 of FIG. 2 is shown with center pivot point 40, negative pressure plenum 44 and positive pressure plenum 42. Negative pressure plenum 44 together with positive pressure plenum 42 provide air flow means to chamber 20 of FIG. 2. As best shown in FIG. 5, chamber 20 is depicted with bypass channel 50, input port 53, and output port 54. Bypass channel 50 incorporates a raised circumferential edge 56 to allow bypass sealing plate 22 of FIG. 3 to seal against this feature. Conversely, input port 53 and output port 54 are recessed below raised circumferential edge 56 to allow unrestricted air flow. Raised support ribs 58 provide support features for bypass sealing plate 22 to rest on without impeding air flow to input port 53 and output port 54.

Figure 6:
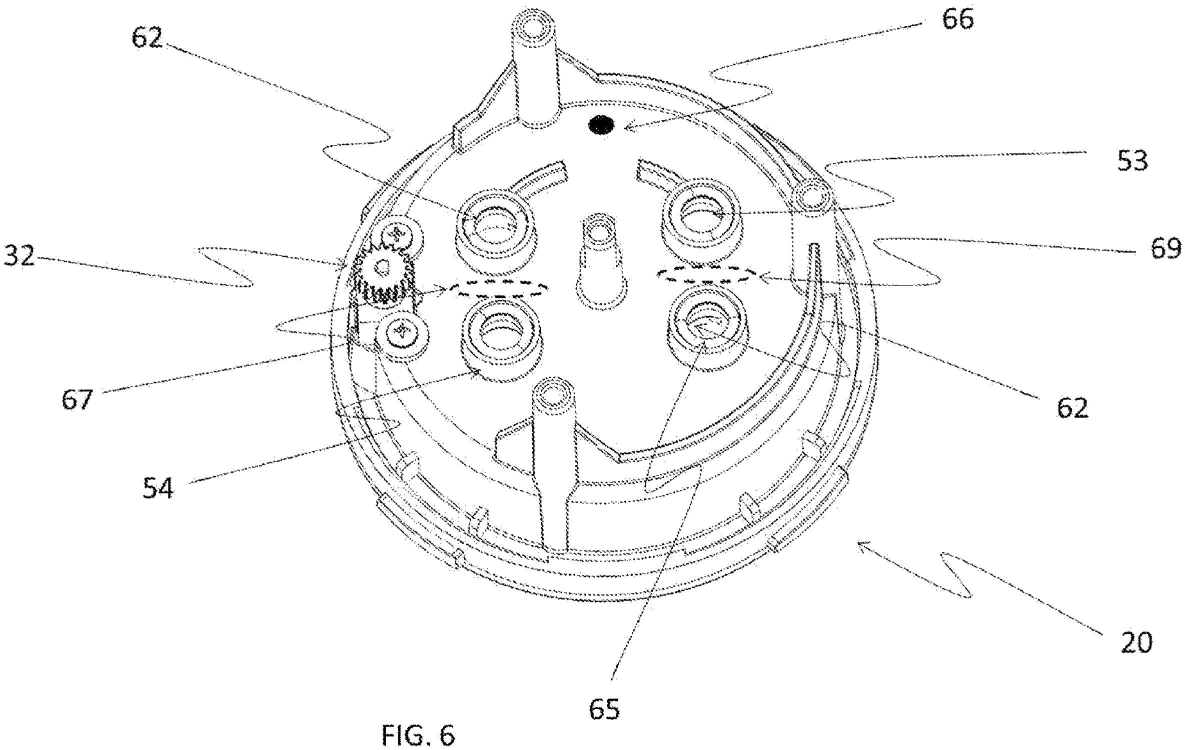
FIG. 6 shows a bottom perspective view of a drying chamber contemplated in a dryer.

As best shown in FIG. 6, chamber 20 is depicted from the bottom side showing bypass channel ports 62 together with input port 53 and output port 54 of FIG. 5. Position location magnet or optical signal reflection rivet 66 is permanently mounted into chamber 20 and provides a magnetic field or optical reflective surface for position sensing. Bypass channel ports 62, input port 53 and output port 54 are all recessed to permit the mounting of sealing O-rings 65. Sealing O-rings 65 are slightly proud of recessed ports to provide a compliant air-tight seal to any planar surface resting on them with some level of force applied on the planar surface. Non-ported areas 67 and 69 allow for airflow between bypass channel ports 62 and input port 53 and output port 54.

Figure 7:
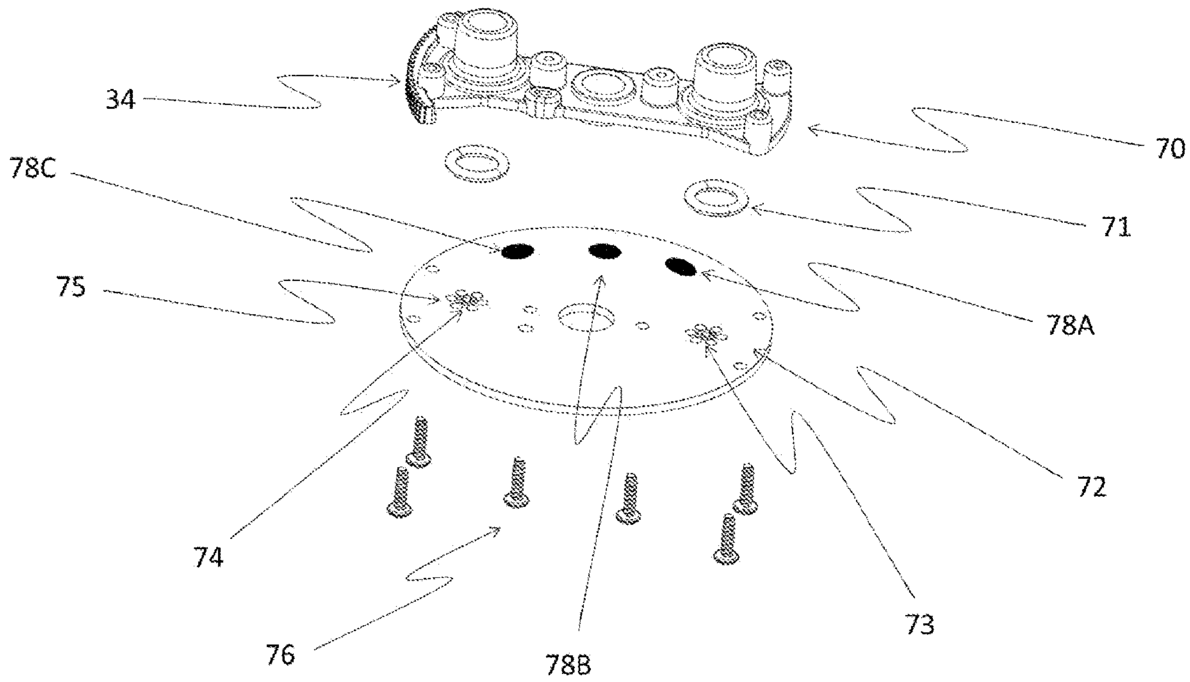
FIG. 7 depicts an exploded isometric top view of an air valve and sensor subassembly in a dryer.

Referring now to FIG. 7, rotary valve 70 is depicted with valve pinion rack 34 of FIG. 3. Rotary valve 70 captivates sealing O-rings 71 against sensor control board 72 and is fastened together with fasteners 76. Sensor control board 72 contains hall effect or optical reflective sensors 78A, 78B, and 78C and output port humidity sensor 74 and input port humidity sensor 73. Through holes 75 surround input port humidity sensor 73 and output port humidity sensor 74 such that airflow can impinge onto humidity sensors 73 and 74 and flow through input port 53 and output port 54 of FIG. 6.

The compressive force imparted onto sealing O-rings 71 through fasteners 76 compressing rotary valve 70 and sensor control board 72 results in an air tight seal between sensor control board 72 and rotary valve 70. Although not shown, the underside of rotary valve 70 can have recessed pockets for sealing O-rings 71 similar to the recessed pockets of FIG. 6.

Figure 8:
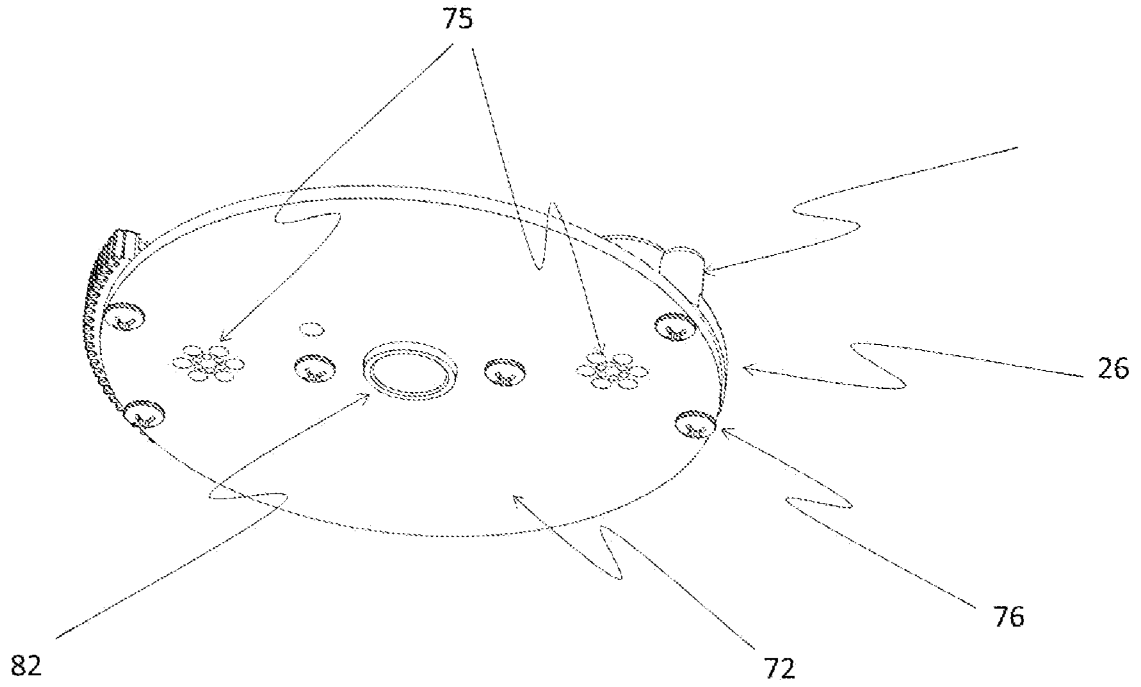
FIG. 8 depicts a isometric bottom view of an air valve and sensor subassembly in a dryer.
Figure 9:
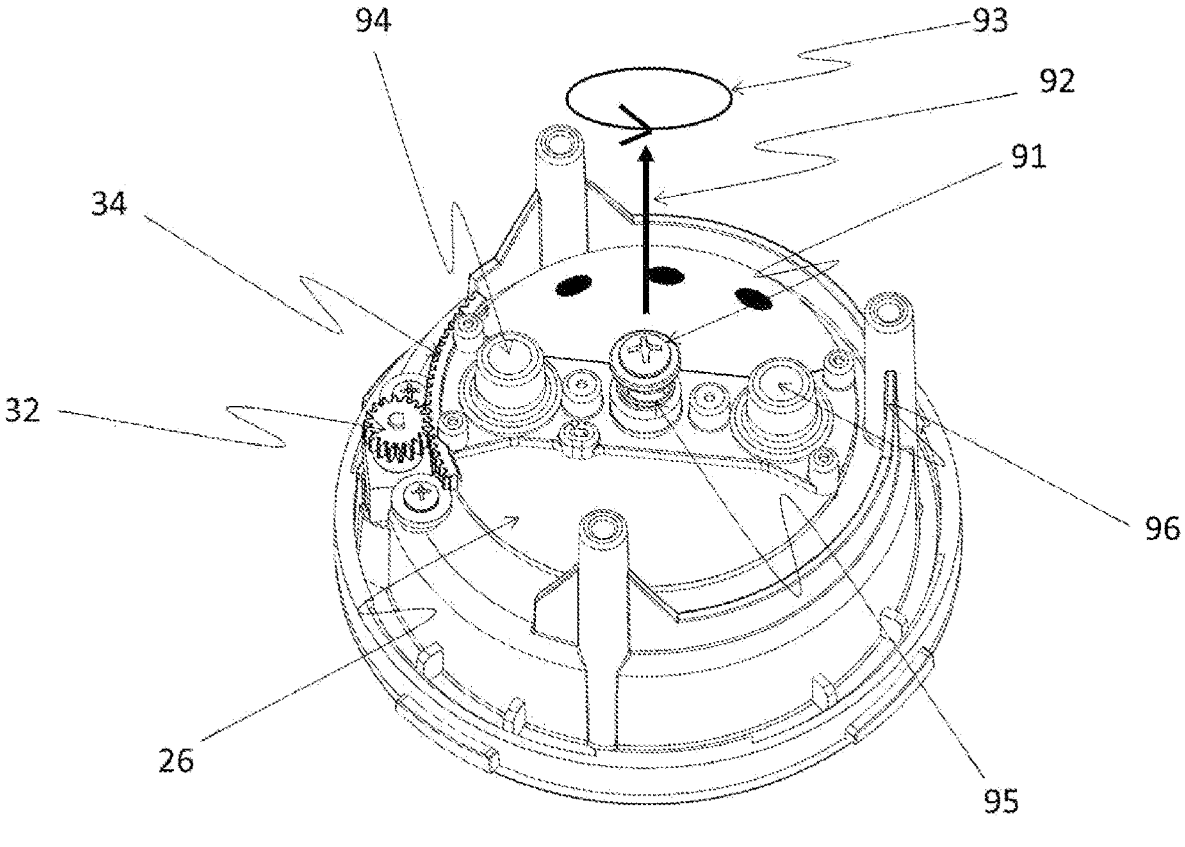
FIG. 9 depicts an exploded isometric bottom view of an air valve and sensor subassembly attached to a drying chamber in a dryer.

As best shown in FIG. 8, the underside of sensor control board 72 is mechanically attached to rotary valve 70 using fasteners 76. Center through hole 82 is used to provide a rotational center point for air valve and sensor subassembly 26. FIG. 9 depicts air valve and sensor subassembly 26 mounted to chamber 20 via captivating fastener 91 and spring 95. Captivating fastener 91 can be a screw, nut, or press-on captivation washer. Spring 95 provides necessary force to air valve and sensor subassembly 26 to allow control sensor board 72 to seal against sealing O-rings 65 of FIG. 6. Pinion gear 32 which mates with valve pinion rack 34 provides a moment about axis 92 and develops rotary motion 93. Valve input port 94 and valve output port 96 allows a means to impinge on input port humidity sensor 73 and output port humidity sensor 74 of FIG. 7.

Figure 10A:
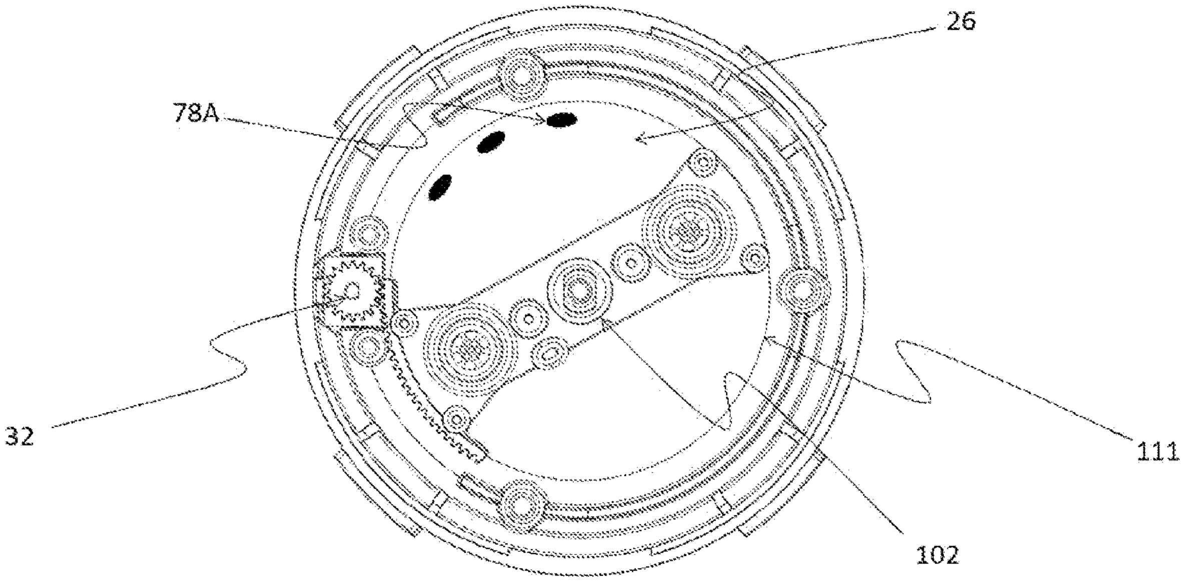
FIG. 10A depicts a bottom view of an air valve and sensor subassembly attached to a drying chamber in a calibration position in a dryer.
Figure 10B:
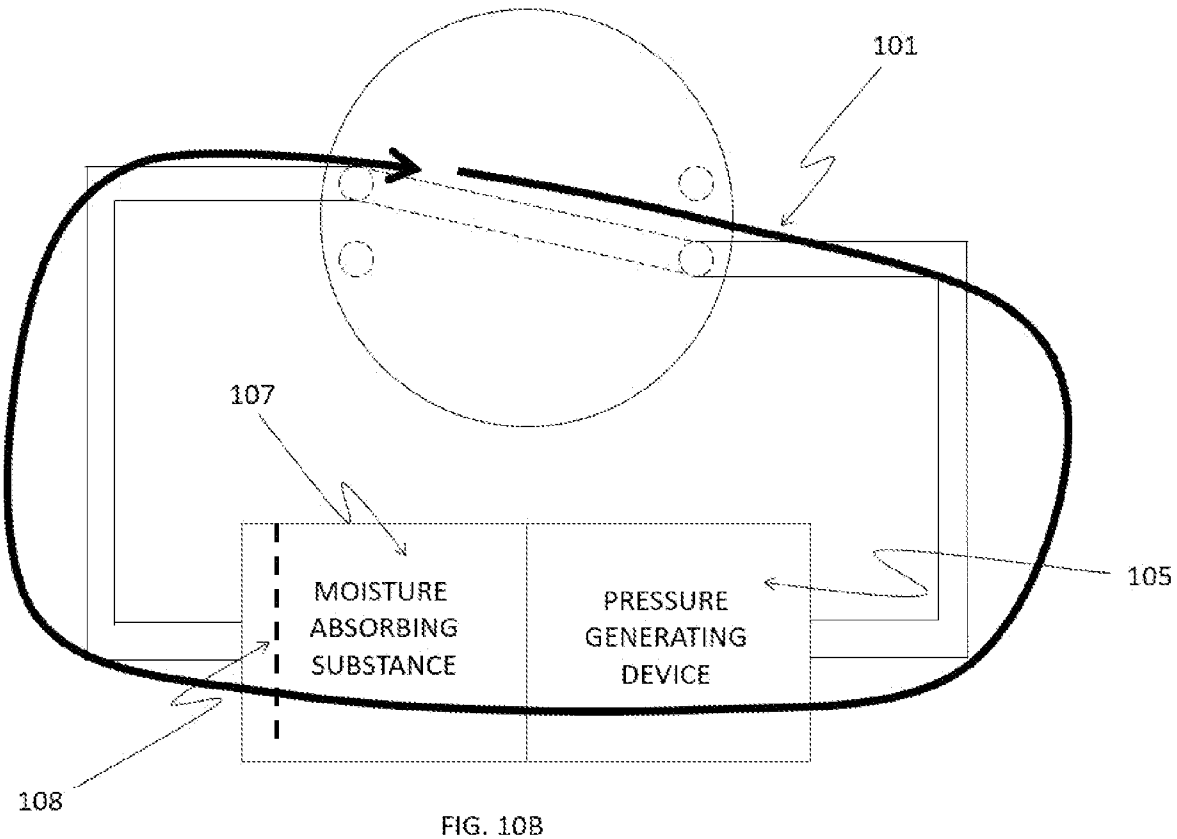
FIG. 10B depicts the air flow when an air valve and sensor subassembly attached to a drying chamber is in the calibration position in the dryer of FIG. 10A.
Figure 10C:
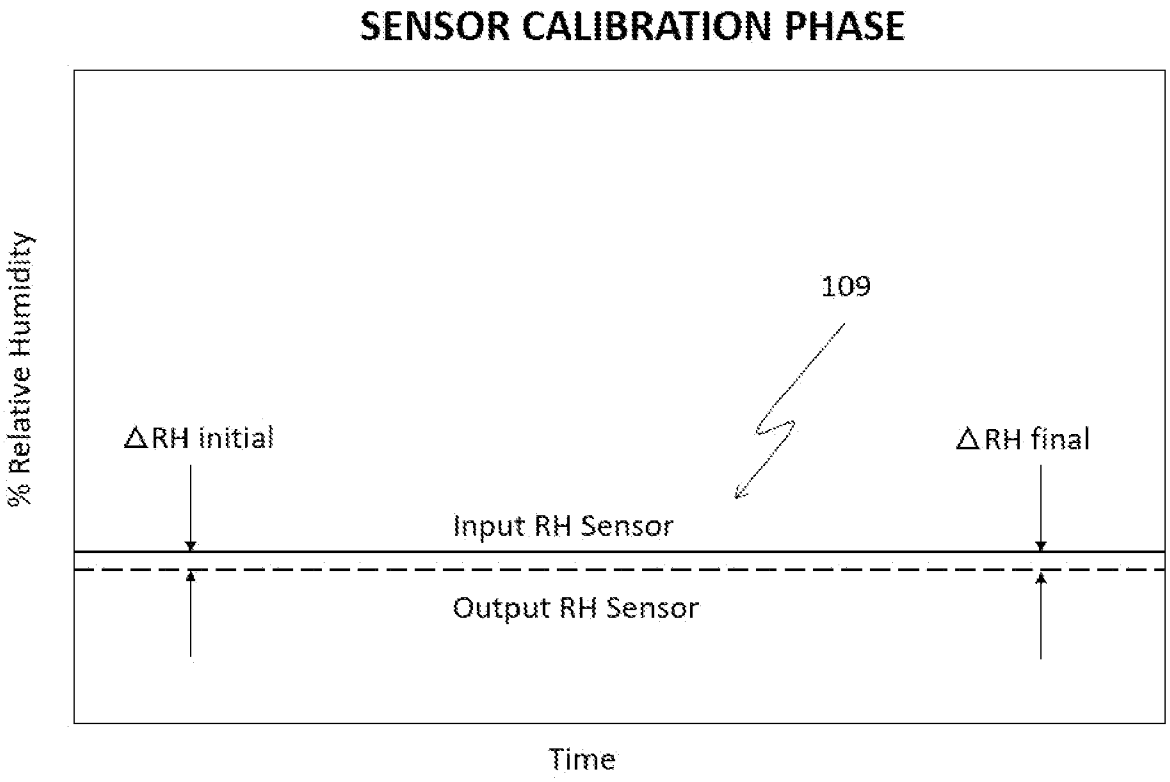
FIG. 10C depicts typical relative humidity response curves for relative humidity sensors during a calibration phase when an air valve and sensor subassembly attached to a drying chamber is in the calibration position in the dryer of FIG. 10A.

FIG. 10A depicts air valve and sensor subassembly 26 in the two and eight o-clock position (111) such that bypass channel 50 of FIG. 5 which is sealed using bypass seal plate 22 of FIG. 3 provides airflow across input port humidity sensor 73, through bypass channel 50, and across output port humidity sensor 74. This position is controlled by the rotation of gearmotor 25 of FIG. 2, pinion gear 32 and valve pinion rack 34 of FIG. 3 and calibration hall effect sensor or optical reflective sensor 78A which is aligned with position location magnet or optical signal reflection rivet 66 of FIG. 6 and electronically locates air valve and sensor subassembly 26 under computer control. Airflow path 101 of FIG. 10B is now engaged via pressure-generating device 105 which pushes air through moisture-absorbing substance 107. Airflow path 101 produces calibration humidity response curves 109 depicted in FIG. 10C which allows for baseline humidity calculation values for input and output humidity sensors 73 and 74 of FIG. 7. Due to airtight, closed loop drying, these readings are stored in microcontroller memory as a baseline micro-environment calibration starting point and therefore desired drying ending point for closed loop device drying.

Figure 11A:
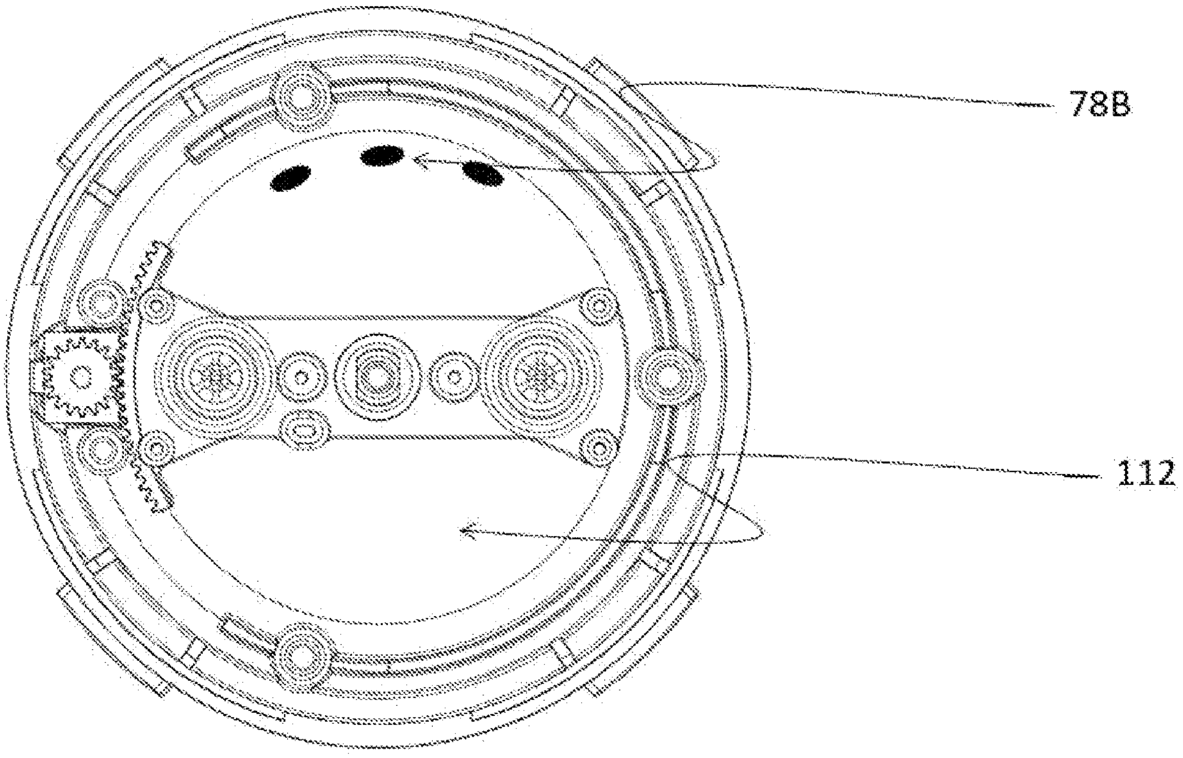
FIG. 11A depicts a bottom view of an air valve and sensor subassembly attached to a drying chamber at a regeneration position in a dryer.
Figure 11B:
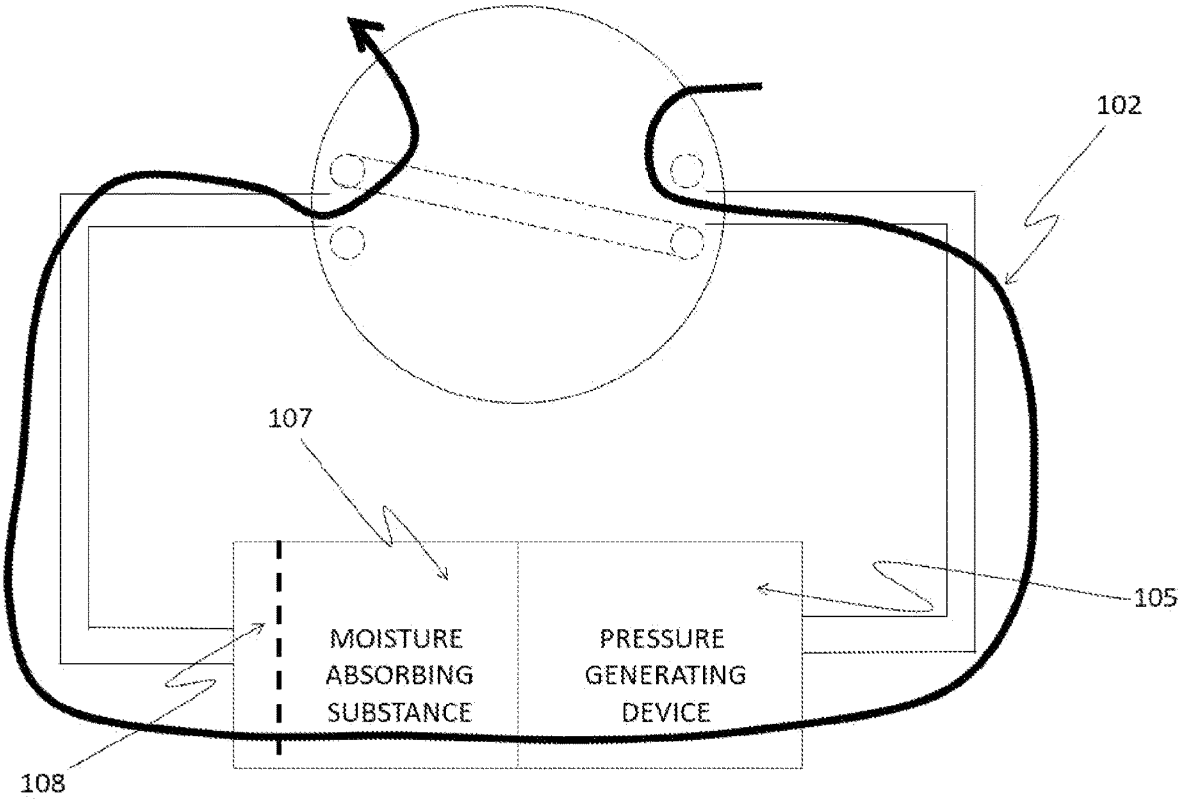
FIG. 11B depicts the air flow with an air valve and sensor subassembly attached to a drying chamber at the regeneration position in the dryer of FIG. 11A.

FIG. 11A depicts air valve and sensor subassembly 26 in the three and nine o-clock position (112) which is the desiccant regeneration position. In the three and nine o-clock position, the air valve and sensor subassembly 26 are positioned such that through holes 75 of FIG. 8 are directly in-between bypass channel ports 62, input port 53 and output port 54 of FIG. 6. This provides an air valve and sensor subassembly 26 position which disengages flow to the airtight chamber altogether. Air flow path 102 depicted in FIG. 11B flows through non-ported exhaust channel 67 and non-ported input channel 69 of FIG. 6 and between bypass channel ports 62 and input port 63 and output port 64. Air flows across input port humidity sensor 73, through non-ported exhaust channel 67 and non-ported input channel 69 and across output port humidity sensor 74. The three and nine o-clock position is controlled by regen hall effect sensor or optical reflective sensor 78B which is aligned with position location magnet or optical signal reflection rivet 66. Again referring to FIG. 11B, Airflow path 102 is now engaged via pressure-generating device 105 which pushes moisture laden air through moisture-absorbing substance 107 being baked by perforated desiccant heater 108. Airflow path 102 ensures moisture laden air being sampled on input port humidity sensor 73 response is compared to output port humidity sensor 74 response and continues a baking sequence until input port humidity sensor 73 response converges to output port humidity sensor 74 response.

Figure 12A:
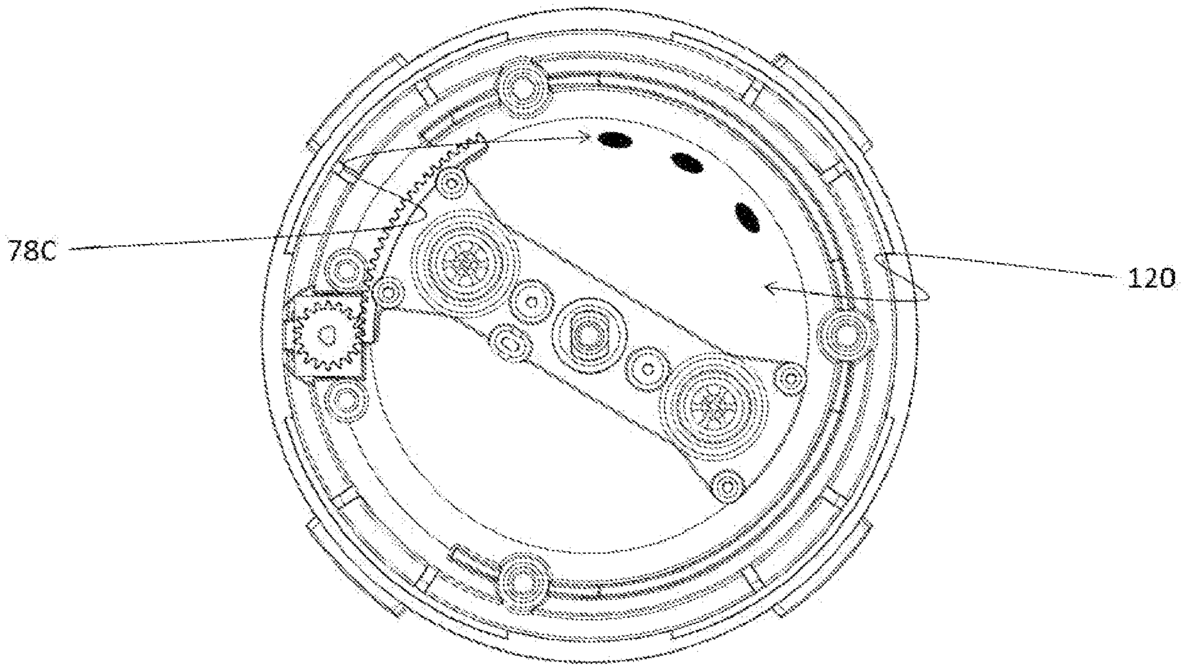
FIG. 12A depicts a bottom view of an air valve and sensor subassembly attached to a drying chamber at a drying position in a dryer.
Figure 12B:
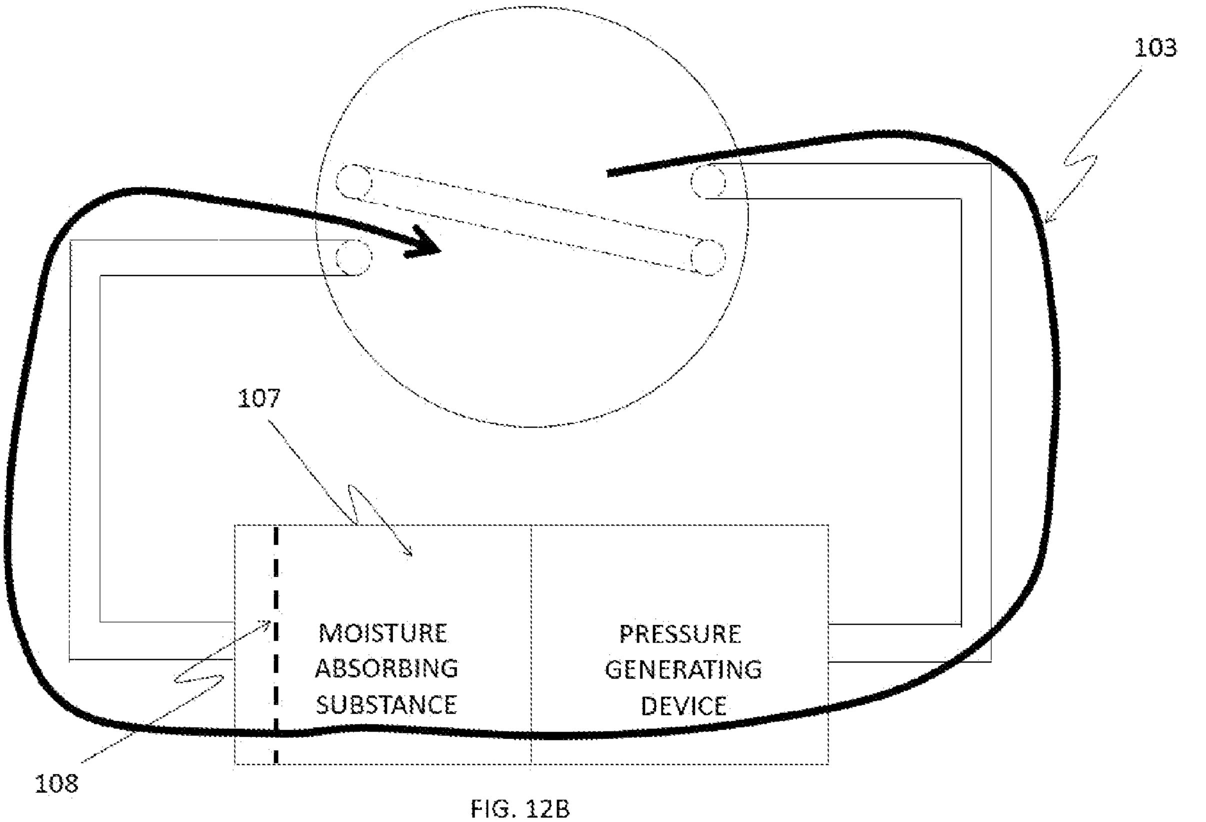
FIG. 12B depicts the air flow with an air valve and sensor subassembly attached to a drying chamber at the drying position in the dryer of FIG. 12A.

FIG. 12A depicts air valve and sensor subassembly 26 of FIG. 9 in the four and ten o-clock position (120) such that input port 53 of FIG. 6 provides airflow across input port humidity sensor 73 of FIG. 7, through chamber 20 of FIG. 2 interior, across output port humidity sensor 74 of FIG. 7 and output port 54 of FIG. 6. This position is controlled by hall effect sensor or optical reflective sensor 78C which is aligned with position location magnet or optical signal reflection rivet 66. Airflow path 103 of FIG. 12B is now engaged via pressure-generating device 105 which pushes air through moisture-absorbing substance 107. As the airflow flows across the desiccant, the humidity of the airflow drops below 20% relative humidity. This closed loop drying path 103 produces a low-humidity environment at room ambient temperature and allows for consistent and reliable moisture uptake in any device within chamber 20 interior. The airflow on Airflow path 103 has a flow rate of at least 2 CFM and no more than 4 CFM. The combination of the flow rate, low relative humidity, and room ambient temperature maximizes evaporation of water. Any moisture entrained inside in any device within chamber 20 interior will migrate out through the device's plastic due to the hygroscopic quality of plastic. In some embodiments, the air volume within chamber 20 interior may be decreased while the static pressure generated by pressure-generating device 105 is increased to further expedite the moisture uptake.

Figure 12C:
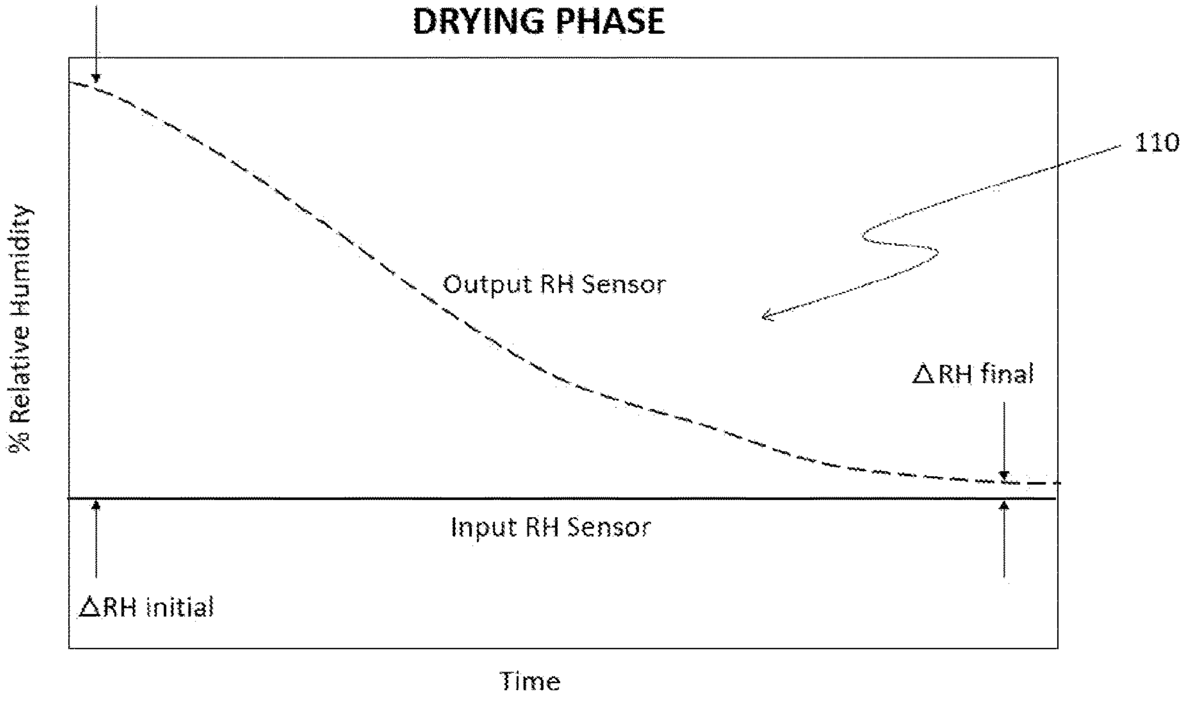
FIG. 12C depicts typical relative humidity response curves for relative humidity sensors during a drying phase when an air valve and sensor subassembly attached to a drying chamber is at the drying position in the dryer of FIG. 12A.

Airflow path 103 of FIG. 12B produces humidity response curves 110 depicted in FIG. 12C which allows for moisture laden air being sampled on output port humidity sensor 74 response to be compared to input port humidity sensor 73 response and continues a drying sequence until output port humidity sensor 74 response converges to input port humidity sensor 73 response saved in memory during calibration. These response curves are compared to baseline response curves 109 of FIG. 10C which allows a drying endpoint to be calculated.

Figure 13:
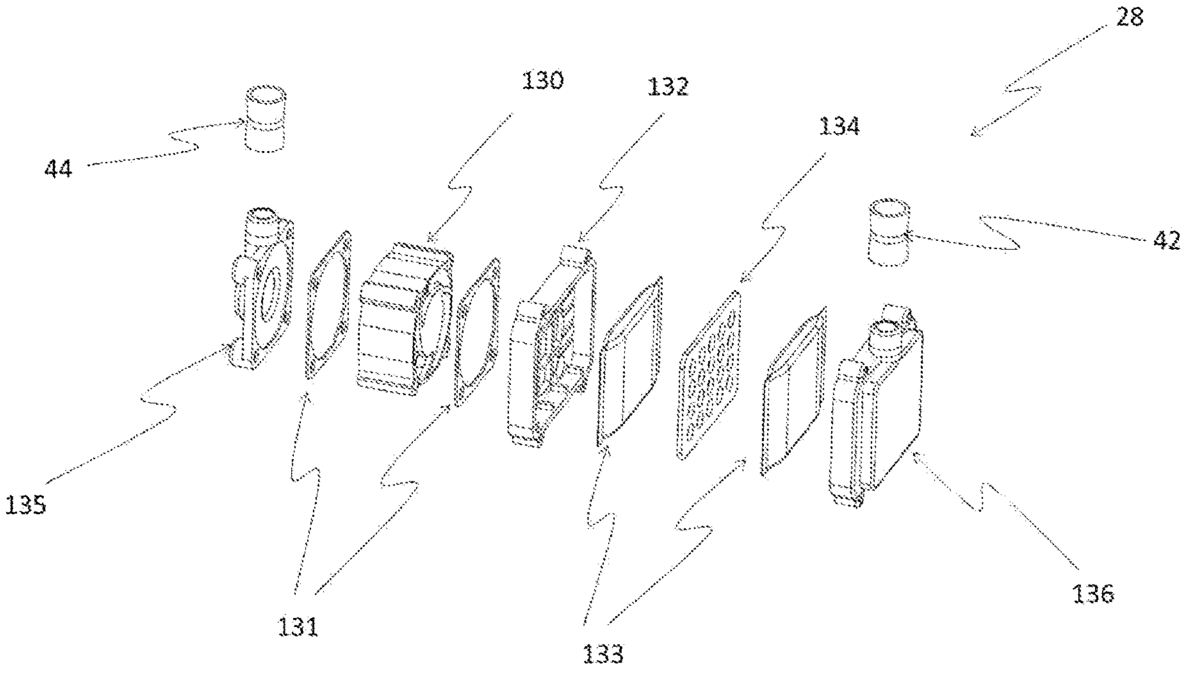
FIG. 13 depicts an exploded isometric view of a pressure-generating device and moisture-absorbing substance subassembly in the dryer.
Figure 14:
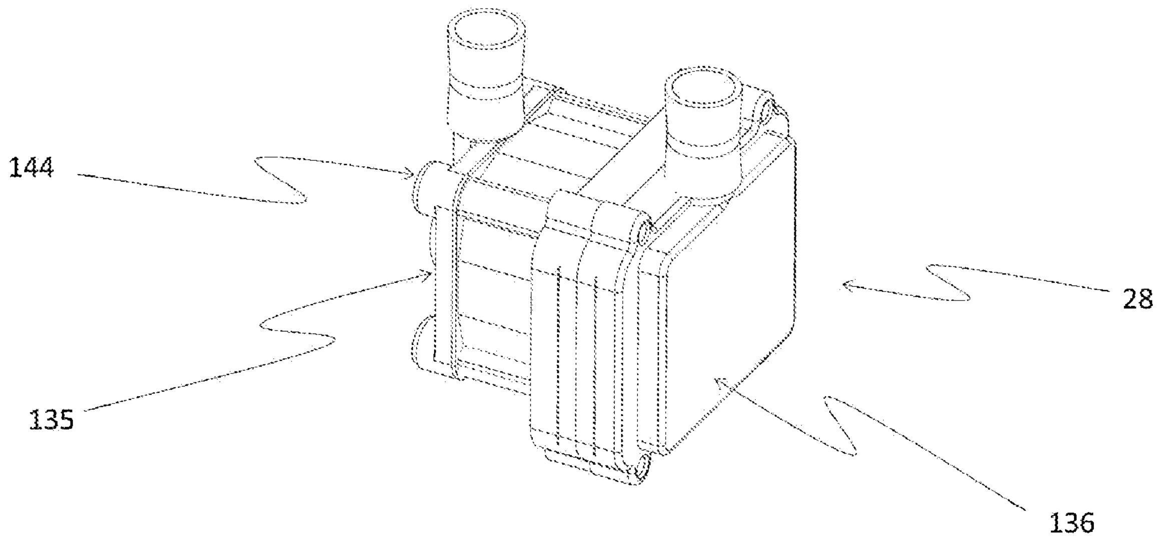
FIG. 14 depicts an isometric view of an assembled pressure-generating device and moisture-absorbing substance subassembly in the dryer of FIG. 13.

As best shown in FIG. 13, pressure-generating device and moisture-absorbing substance subassembly 28 is depicted in an exploded view. Pressure-generating device 130 utilizes seals 131 to provide an airtight seal against input header 135 and desiccator grill 132. Desiccator regenerative heater 134 is captivated between desiccator pouches 133 and held together by desiccator grill 132 and output header 136. Input header 135 utilizes suction plenum 44 to draw air in from drying chamber subassembly 16 of FIG. 1, while output header 136 incorporates pressure plenum 42 to push air into drying chamber subassembly 16 of FIG. 1. Suction plenum 44 and pressure plenum 42 utilize o-rings for air-tight sealing purposes and snap features to mechanically couple to valve input port 44 and valve output port 96 of FIG. 9. Once assembled, pressure-generating device and moisture-absorbing substance subassembly 28 is shown in FIG. 14 as an assembled stack utilizing fasteners 144 to compress input header 135 and pressure output 136 thus providing an airtight subassembly.

Figure 11C:
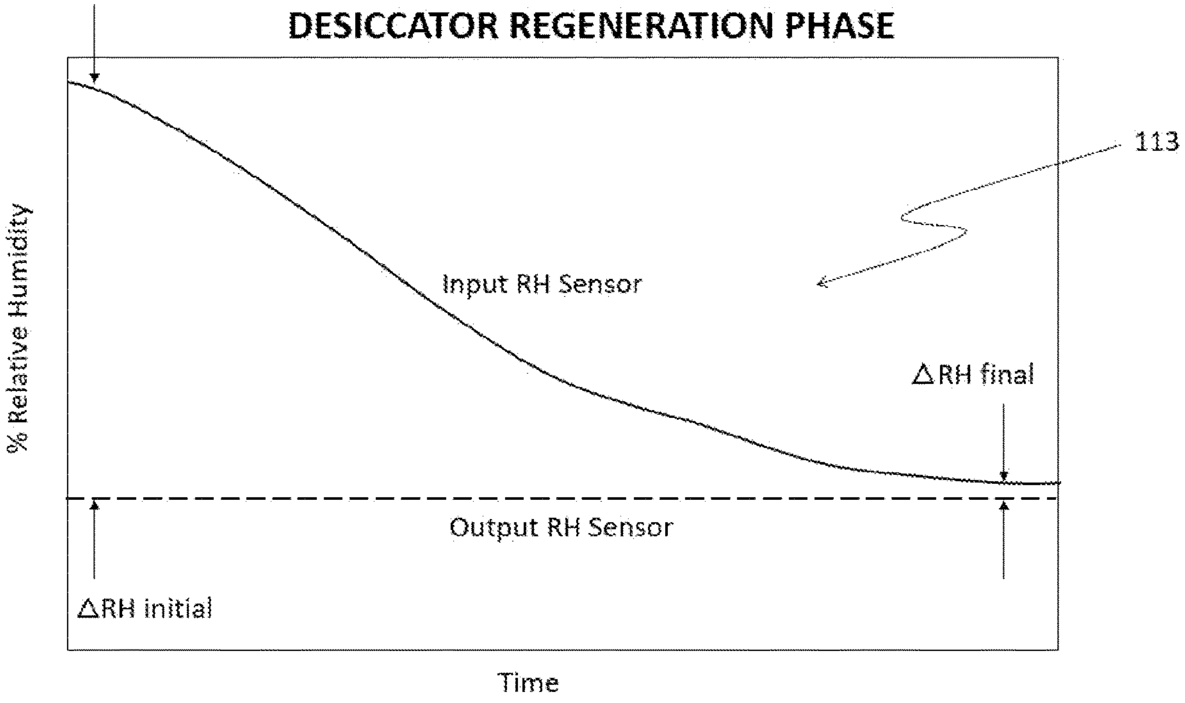
FIG. 11C depicts typical relative humidity response curves for relative humidity sensors during a desiccator regeneration phase when an air valve and sensor subassembly attached to a drying chamber is at the regeneration position in the dryer of FIG. 11A.
Figure 15:
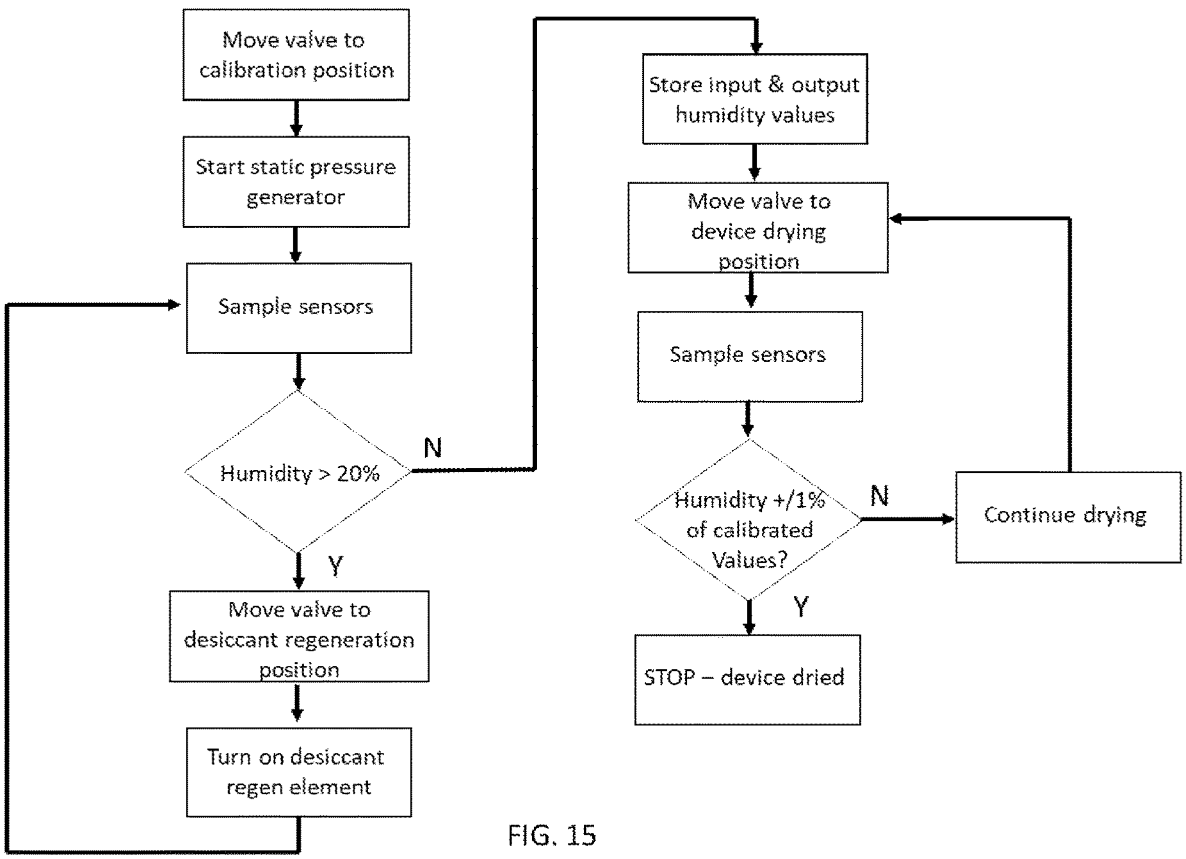
FIG. 15 depicts a flowchart of the control code algorithm provided to a microcontroller in the dryer of FIG. 13.

FIG. 15 describes the control code algorithms which allow the calibration, desiccant regeneration, and drying phases of the dryer. The process is started with moving the valve to the calibration position of FIG. 10, sampling the humidity sensors 73 and 74 of FIG. 7, and if the humidity is greater than 20%, moving the valve to the desiccant regeneration position of FIG. 11. During calibration, the humidity threshold may be adjusted to compensate for temperature increases in the humidity sensors 73 and 74 in order to increase the accuracy of humidity readings. Once position of FIG. 11A is achieved, the desiccator regenerative heater 134 of FIG. 13 is powered and the desiccant bakes out the moisture which has been entrained. Humidity sensors are constantly sampled until the humidity drops below 20% which signifies the desiccant is dried to a point whereby it can now produce an ultra-dry micro environment. In some embodiments, the dryer can be configured to maintain a different humidity level for purposes of maintaining products for which humidity level is critical for optimal usage, such as tobacco products, medical marijuana, and leather products like baseballs. Then, air valve and sensor subassembly 26 of FIG. 9 is moved to the position in FIG. 12A and humidity sensors 73 and 74 are once again constantly sampled. Once the humidity values are within +/−1% of each other, the closed loop is not taking up any additional moisture and the device is dry.

The present application incorporates by reference the entirety of U.S. application Ser. No. 18/228,504 (filed on Jul. 31, 2023 and entitled, "METHODS AND APPARATUSES FOR DRYING ELECTRONIC DEVICES"). U.S. application Ser. No. 18/228,504 is a continuation of U.S. application Ser. No. 17/134,492. The present application incorporates by reference the entirety of U.S. application Ser. No. 17/134,492 (filed on Dec. 27, 2020, entitled, "METHODS AND APPARATUSES FOR DRYING ELECTRONIC DEVICES" and issued as U.S. Pat. No. 11,713,924). U.S. application Ser. No. 17/134,492 is a continuation of U.S. application Ser. No. 16/854,862. The present application incorporates by reference the entirety of U.S. application Ser. No. 16/854,862 (filed on Apr. 21, 2020, entitled "METHODS AND APPARATUSES FOR DRYING ELECTRONIC DEVICES" and issued as U.S. Pat. No. 10,876,792). U.S. application Ser. No. 16/854,862 is a continuation-in-part of U.S. application Ser. No. 16/575,306. The present application incorporates by reference the entirety of U.S. application Ser. No. 16/575,306 (filed on Sep. 18, 2019, entitled "METHODS AND APPARATUSES FOR DRYING ELECTRONIC DEVICES" and issued as U.S. Pat. No. 10,690,413). U.S. application Ser. No. 16/575,306 is a continuation-in-part of U.S. application Ser. No. 16/363,742. The present application incorporates by reference the entirety of U.S. application Ser. No. 16/363,742 (filed on Mar. 25, 2019, entitled "METHODS AND APPARATUSES FOR DRYING ELECTRONIC DEVICES" and issued as U.S. Pat. No. 10,928,135). U.S. application Ser. No. 16/363,742 is a continuation of U.S. application Ser. No. 15/979,446. The present application incorporates by reference the entirety of U.S. application Ser. No. 15/979,446 (filed on May 14, 2018, entitled "METHODS AND APPARATUSES FOR DRYING ELECTRONIC DEVICES" and issued as U.S. Pat. No. 10,240,867). U.S. application Ser. No. 15/979,446 is a continuation in-part of U.S. application Ser. No. 15/811,633.

The present application incorporates by reference the entirety of U.S. patent application Ser. No. 15/811,633 (filed on Nov. 13, 2017 and entitled, "METHODS AND APPARATUSES FOR DRYING ELECTRONIC DEVICES"), and issued as U.S. Pat. No. 9,970,708, for all purposes. U.S. application Ser. No. 15/811,633 is a continuation in-part of U.S. application Ser. No. 15/688,551.

The present application incorporates by reference the entirety of U.S. patent application Ser. No. 15/688,551 (filed on Aug. 28, 2017 and entitled, "METHODS AND APPARATUSES FOR DRYING ELECTRONIC DEVICES"), and issued as U.S. Pat. No. 9,816,757, for all purposes. U.S. patent application Ser. No. 15/688,551 is a continuation of U.S. patent application Ser. No. 15/478,992. The present application incorporates by reference the entirety of U.S. patent application Ser. No. 15/478,992 (filed on Apr. 4, 2017 and entitled, "METHODS AND APPARATUSES FOR DRYING ELECTRONIC DEVICES"), and issued as U.S. Pat. No. 9,746,241, for all purposes. U.S. patent application Ser. No. 15/478,992 is a continuation of U.S. patent application Ser. No. 15/369,742, which as indicated below, is also incorporated by reference for all purposes. U.S. patent application Ser. No. 15/478,992 is a continuation of U.S. patent application Ser. No. 15/369,742, filed on Dec. 5, 2016, issued as U.S. Pat. No. 9,644,891, which is a continuation-in-part of U.S. patent application Ser. No. 14/213,142, filed Mar. 14, 2014 issued as U.S. Pat. No. 9,513,053, which claims priority of U.S. Provisional Application No. 61/782,985, filed Mar. 14, 2013, which are all incorporated herein by reference in their entirety, for all purposes. U.S. patent application Ser. No. 15/369,742 is also a continuation-in-part of U.S. patent application Ser. No. 14/665,008, filed Mar. 23, 2015, which is a division of U.S. patent application Ser. No. 13/756,879, filed Feb. 1, 2013, which claims priority to U.S. Provisional Application No. 61/638,599, filed Apr. 26, 2012, and U.S. Provisional Application No. 61/593,617, filed Feb. 1, 2012, all of which are incorporated by reference in their entirety, for all purposes.

U.S. patent application Ser. No. 14/213,142 is a non-provisional application of U.S. Provisional Patent Application No. 61/782,985 (filed Mar. 14, 2013 and entitled, "METHODS AND APPARATUSES FOR DRYING ELECTRONIC DEVICES"), which are all incorporated by reference in their entirety for all purposes.

The present application incorporates by reference the entirety of U.S. patent application Ser. No. 14/213,142 (filed on Mar. 14, 2014 and entitled, "METHODS AND APPARATUSES FOR DRYING ELECTRONIC DEVICES") for all purposes. U.S. patent application Ser. No. 14/213,142 is a non-provisional application of U.S. Provisional Patent Application No. 61/782,985 (filed Mar. 14, 2013 and entitled, "METHODS AND APPARATUSES FOR DRYING ELECTRONIC DEVICES"), which is also incorporated by reference in entirety for all purposes.

The present application incorporates by reference the entirety of U.S. patent application Ser. No. 14/665,008 (filed on Mar. 23, 2015 and entitled, "METHODS AND APPARATUSES FOR DRYING ELECTRONIC DEVICES") for all purposes. U.S. patent application Ser. No. 14/665,008 is a divisional application of U.S. patent application Ser. No. 13/756,879 (filed Feb. 1, 2013 and entitled, "METHODS AND APPARATUSES FOR DRYING ELECTRONIC DEVICES"). The present application incorporates by reference the entirety of U.S. patent application Ser. No. 13/756,879 (filed Feb. 1, 2013 and entitled, "METHODS AND APPARATUSES FOR DRYING ELECTRONIC DEVICES"). The U.S. patent application Ser. No. 13/756,879 is a non-provisional application of U.S. Provisional Patent Application Nos. 61/638,599 (filed Apr. 26, 2012 and entitled, "METHODS AND APPARATUSES FOR DRYING AND DISINFECTING PORTABLE ELECTRONIC DEVICES") and 61/593,617 (filed Feb. 1, 2012 and entitled, "METHODS AND APPARATUSES FOR DRYING PORTABLE ELECTRONIC DEVICES"), which are all also incorporated by reference in entirety for all purposes.

Some embodiments include one or more microprocessors (or one or more processors) which can be a microcontroller, general or specific purpose microprocessor, or generally any type of controller that can perform the requisite control functions. The microprocessor can reads its program from a memory, and may be comprised of one or more components configured as a single unit. Alternatively, when of a multi-component form, the microprocessor may have one or more components located remotely relative to the others. One or more components of the microprocessor may be of the electronic variety including digital circuitry, analog circuitry, or both. In one embodiment, the microprocessor is of a conventional, integrated circuit microprocessor arrangement, such as one or more CORE i7 HEXA processors from INTEL Corporation (450 Mission College Boulevard, Santa Clara, Calif 95052, USA), ATHLON or PHENOM processors from Advanced Micro Devices (One AMD Place, Sunnyvale, Calif 94088, USA), POWER8 processors from IBM Corporation (1 New Orchard Road, Armonk, N.Y. 10504, USA), or PIC Microcontrollers from Microchip Technologies (2355 West Chandler Boulevard, Chandler, Ariz. 85224, USA). In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Likewise, some embodiments include one or more memories or memory systems. A memory may include one or more types such as solid-state electronic memory, magnetic memory, or optical memory, just to name a few. By way of non-limiting example, a memory can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; or a plurality and/or combination of these memory types. Also, a memory may be volatile, nonvolatile, or a hybrid combination of volatile and nonvolatile varieties. A memory in various embodiments is encoded with programming instructions executable by a microprocessor to perform the automated methods disclosed herein.

While illustrated examples, representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the disclosure are desired to be protected.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems.

The term signal, signals, data, or information may refer to a single signal or multiple signals. Any reference to a signal may be a reference to an attribute of the signal, and any reference to a signal attribute may refer to a signal associated with the signal attribute. As used herein, the term "real-time" or "dynamically" in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, any operation used herein may be interchangeably used with the term "transform" or "transformation."

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the disclosure(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the disclosure(s) set out in any claims that may issue from this disclosure. Specifically, a description of a technology in the "Background" is not to be construed as an admission that technology is prior art to any disclosure(s) in this disclosure. Neither is the "Summary" to be considered as a characterization of the disclosure(s) set forth in issued claims. Furthermore, any reference in this disclosure to "disclosure" in the singular should not be used to argue that there is only a single point of novelty in this disclosure. Multiple disclosures may be set forth according to the limitations of the multiple claims issuing from this disclosure, and such claims accordingly define the disclosure(s), and their equivalents, that are protected thereby. In all instances, the scope of such claims shall be considered on their own merits in light of this disclosure, but should not be constrained by the headings herein.

What is claimed is:

1. A method comprising:

providing a drying chamber for receiving an electronic device in the drying chamber, wherein at least one air valve is configured to engage the drying chamber, wherein at least one sensor is positioned with respect to the at least one air valve, wherein at least one exhaust channel is configured to be engaged by the at least one air valve, wherein at least one moisture-absorbing substance is connected to the at least one air valve, wherein at least one pressure-generating device is connected to the at least one air valve, wherein at least one controller is connected to at least one of the at least one air valve, the at least one pressure-generating device, and the at least one moisture-absorbing substance, wherein at least one computing device provides instructions for the at least one controller;

initiating, using the at least one controller, based on a first instruction received from the at least one computing device, a calibration process, wherein the calibration process comprises:

positioning or maintaining, using the at least one controller, the at least one air valve in a calibration position, wherein, in the calibration position, the at least one air valve disengages or continues to disengage from the drying chamber, generating, using the at least one pressure-generating device, a first airflow, associated with a pressure, wherein the first airflow flows, on a first air path, from the at least one pressure-generating device into the at least one moisture-absorbing substance, thereby resulting in a second airflow, wherein the second airflow flows, on a second air path, from the at least one moisture-absorbing substance into the at least one air valve, and then from the at least one air valve into the at least one pressure-generating device, sensing, using the at least one sensor, a first moisture-based parameter of the second airflow, and executing, using the first moisture-based parameter, a first computation, thereby producing a first computation result based on a first condition;

in response to the first computation result meeting the first condition:

initiating, using the at least one controller, based on a second instruction received from the at least one computing device, a regeneration process, wherein the regeneration process comprises:

positioning or maintaining, using the at least one controller, the at least one air valve in a regeneration position, wherein, in the regeneration position, the at least one air valve engages or continues to engage the at least one exhaust channel, drying the at least one moisture-absorbing substance, generating, using the at least one pressure-generating device, the first airflow, associated with the pressure, wherein the first airflow flows, on the first air path, thereby resulting in a third airflow, wherein the third airflow flows, on a third air path, from the at least one moisture-absorbing substance into the at least one air valve, and then from the at least one air valve into the at least one exhaust channel, sensing, using the at least one sensor, a second moisture-based parameter of the third airflow, and executing, using the second moisture-based parameter, a second computation, thereby producing a second computation result based on a second condition; and in response to the second computation result not meeting the second condition:

re-initiating, using the at least one controller, based on the second instruction received from the at least one computing device, the regeneration process until the second computation result meets the second condition.

2. The method of claim 1 further comprising:

in response to the first computation result not meeting the first condition:

initiating, using the at least one controller, based on a third instruction received from the at least one computing device, a drying process; and in response to a third computation result not meeting the third condition:

re-initiating, using the at least one controller, based on the third instruction received from the at least one computing device, the drying process until the third computation result meets the third condition.

3. The method of claim 1, wherein the first computation comprises comparing the first moisture-based parameter to a threshold, wherein the first condition comprises the first moisture-based parameter being greater than the threshold, and wherein the second computation comprises comparing the second moisture-based parameter to the threshold, wherein the second condition comprises the second moisture-based parameter being less than or equal to the threshold.

4. The method of claim 1 further comprising:

in response to the second computation result meeting the second condition:

storing, using the at least one computing device, the second computation result, and initiating, using the at least one controller, based on a third instruction received from the at least one computing device, a drying process, wherein the drying process comprises:

positioning or maintaining, using the at least one controller, the at least one air valve to a drying position, wherein, in the drying position, the at least one air valve engages or continues to engage with the drying chamber, thereby creating a closed loop for air flow, generating, using the at least one pressure-generating device, the first airflow, associated with the pressure, wherein the first airflow flows, on the first air path, thereby resulting in a fourth airflow, wherein the fourth airflow flows, on a fourth air path, from the at least one moisture-absorbing substance into the at least one air valve, and then from the at least one air valve into the drying chamber, and then from the at least one air valve into the at least one pressure-generating device, sensing, using the at least one sensor, a third moisture-based parameter of the fourth airflow, and executing, using the third moisture-based parameter, a third computation, thereby producing a third computation result based on a third condition; and in response to the third computation result not meeting the third condition:

re-initiating, using the at least one controller, based on the third instruction received from the at least one computing device, the drying process until the third computation result meets the third condition.

5. The method of claim 1, wherein drying the at least one moisture-absorbing substance comprises heating the at least one moisture-absorbing substance.

6. The methods of claim 1, wherein positioning the at least one air valve comprises rotating the at least one air valve, wherein the at least one air valve is further configured to permit rotation, wherein the at least one air valve rotates into multiple positions.

7. The method of claim 4,
wherein the at least one sensor comprises an input sensor and an output sensor,
wherein the fourth airflow comprises a fourth input airflow and a fourth output airflow, wherein the fourth input airflow impinges on the input sensor and the fourth output airflow impinges on the output sensor,
wherein the third moisture-based parameter comprises a third input moisture-based parameter and a third output moisture-based parameter, wherein the third input moisture-based parameter is produced by the input sensor and the third output moisture-based parameter is produced by the output sensor,
wherein the third computation comprises comparing the third input moisture-based parameter and the third output moisture-based parameter, and
wherein the third condition comprises the third input moisture-based parameter and the third output moisture-based parameter being substantially equal.

8. The method of claim 4, wherein the first air path, the second air path, and the fourth air path have a temperature substantially equal to room ambient temperature.

9. The method of claim 4, wherein the second airflow, the third airflow, the fourth airflow have a humidity less than 20% relative humidity as it leaves the at least one moisture-absorbing substance.

10. The method of claim 7, wherein the third condition comprises the third input moisture-based parameter and the third output moisture-based parameter having a percentage difference less than 1% difference.

11. An apparatus comprising:
a drying chamber, for receiving an electronic device;
at least one air valve, wherein the at least one air valve is configured to engage the drying chamber;
at least one sensor, wherein the at least one sensor is positioned with respect to the at least one air valve;
at least one exhaust channel, wherein the at least one exhaust channel is configured to be engaged by the at least one air valve;
at least one moisture-absorbing substance, wherein the at least one moisture-absorbing substance is connected to the at least one air valve;
at least one pressure-generating device, wherein the at least one pressure-generating device is connected to the at least one air valve;
at least one controller, wherein the at least one controller is connected to at least one of the at least one air valve, the at least one pressure-generating device, and the at least one moisture-absorbing substance; and
at least one computing device, wherein the at least one computing device provides the at least one controller a first instruction configured to execute a calibration process, a second instruction configured to execute a regeneration process, and a third instruction configured to execute a drying process,
wherein the calibration process comprises:
positioning or maintaining, using the at least one controller, the at least one air valve in a calibration position, wherein, in the calibration position, the at least one air valve disengages or continues to disengage from the drying chamber,
generating, using the at least one pressure-generating device, a first airflow, associated with a pressure, wherein the first airflow flows, on a first air path, from the at least one pressure-generating device into the at least one moisture-absorbing substance, thereby resulting in a second airflow, wherein the second airflow flows, on a second air path, from the at least one moisture-absorbing substance into the at least one air valve, and then from the at least one air valve into the at least one pressure-generating device,
sensing, using the at least one sensor, a first moisture-based parameter of the second airflow, and
executing, using the first moisture-based parameter, a first computation, thereby producing a first computation result based on a first condition,
wherein the regeneration process comprises:
positioning or maintaining, using the at least one controller, the at least one air valve in a regeneration position, wherein, in the regeneration position, the at least one air valve engages or continues to engage the at least one exhaust channel,
drying the at least one moisture-absorbing substance,
generating, using the at least one pressure-generating device, the first airflow, associated with the pressure, wherein the first airflow flows, on the first air path, thereby resulting in a third airflow, wherein the third airflow flows, on a third air path, from the at least one moisture-absorbing substance into the at least one air valve, and then from the at least one air valve into the at least one exhaust channel,
sensing, using the at least one sensor, a second moisture-based parameter of the third airflow, and
executing, using the second moisture-based parameter, a second computation, thereby producing a second computation result based on a second condition, wherein the drying process comprises:
positioning or maintaining, using the at least one controller, the at least one air valve to a drying position, wherein, in the drying position, the at least one air valve engages or continues to engage with the drying chamber, thereby creating a closed loop for air flow,
generating, using the at least one pressure-generating device, the first airflow, associated with the pressure, wherein the first airflow flows, on the first air path, thereby resulting in a fourth airflow, wherein the fourth airflow flows, on a fourth air path, from the at least one moisture-absorbing substance into the at least one air valve, and then from the at least one air valve into the drying chamber, and then from the at least one air valve into the at least one pressure-generating device,
sensing, using the at least one sensor, a third moisture-based parameter of the fourth airflow, and
executing, using the third moisture-based parameter, a third computation, thereby producing a third computation result based on a third condition.

12. The apparatus of claim 11, wherein the at least one air valve is coupled with a printed circuit board, wherein the printed circuit board comprises:
the at least one sensor;
one or more openings, thereby permitting air flow impingement on the at least one sensor;
a microcontroller;
a motor driver;
a fan driver;
a heater control circuit;
one or more optical reflective sensors; and
one or more hall effect sensors.

* * * * *